United States Patent
Kim et al.

(10) Patent No.: US 12,458,976 B2
(45) Date of Patent: Nov. 4, 2025

(54) FOOD WASTE DISPOSER

(71) Applicant: Samsung Electronics Co., Ltd., Suwon-si (KR)

(72) Inventors: Daegeon Kim, Suwon-si (KR); Yongjie Jin, Suwon-si (KR); Namsoo Park, Suwon-si (KR); Wonyoung Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 18/313,166

(22) Filed: May 5, 2023

(65) Prior Publication Data

US 2024/0009678 A1    Jan. 11, 2024

Related U.S. Application Data

(63) Continuation of application No. PCT/KR2023/005638, filed on Apr. 26, 2023.

(30) Foreign Application Priority Data

Jul. 6, 2022    (KR) .......................... 10-2022-0083393
Aug. 24, 2022    (KR) .......................... 10-2022-0106281

(51) Int. Cl.
*B02C 18/00*    (2006.01)
*B02C 18/12*    (2006.01)
(Continued)

(52) U.S. Cl.
CPC ...... *B02C 18/0092* (2013.01); *B02C 18/0084* (2013.01); *B02C 18/2216* (2013.01);
(Continued)

(58) Field of Classification Search
CPC ........ A47J 43/08; A47J 43/085; A47J 43/087; B02C 2201/06; B02C 2201/066;
(Continued)

(56) References Cited

U.S. PATENT DOCUMENTS 6,658,996 B2 *   12/2003   Eom ..................... B02C 18/12
                                                        241/260.1
9,204,758 B2 *   12/2015   Wong .................... A47J 43/082
(Continued)

FOREIGN PATENT DOCUMENTS

CN    110693355 A  *  1/2020  ............ A47J 43/085
CN    112900564 A  *  6/2021  ......... B02C 18/0092
(Continued)

OTHER PUBLICATIONS

International Search Report and Written Opinion of the International Searching Authority dated Aug. 21, 2023, in connection with International Application No. PCT/KR2023/005638, 10 pages.

(Continued)

*Primary Examiner* — Jared O Brown

(57) ABSTRACT

A food waste disposer includes: a housing; a grinding case positioned inside the housing and configured to be separable from inside of the housing to outside of the housing and treat food waste; a rotating grinder configured to treat the food waste by rotating inside the grinding case and rotatably coupled with respect to a bottom surface of the grinding case; a grinder rotating shaft inserted in the rotating grinder and configured to rotate together with the rotating grinder; and a driver positioned below the grinding case and configured to provide rotation power of the rotating grinder, wherein the driver includes: a driving motor configured to generate power; a shaft driving gear configured to rotate by receiving power of the driving motor; and a connecting shaft configured to be rotatable within a range of a first angle with respect to the shaft driving gear, wherein one end of the connecting shaft is inserted in the grinder rotating shaft and another end of the connecting shaft is inserted in the shaft driving gear to transfer power from the shaft driving gear to the grinder rotating shaft.

20 Claims, 23 Drawing Sheets

(51) Int. Cl.
  B02C 18/22   (2006.01)
  B02C 18/24   (2006.01)
  B09B 3/35    (2022.01)
  B09B 101/70  (2022.01)
  A47J 43/08       (2006.01)

(52) U.S. Cl.
  CPC .............. B02C 18/24 (2013.01); B09B 3/35 (2022.01); *A47J 43/085* (2013.01); *B02C 18/12* (2013.01); *B02C 2201/06* (2013.01); *B02C 2201/063* (2013.01); *B02C 2201/066* (2013.01); *B09B 2101/70* (2022.01); *Y02W 30/40* (2015.05); *Y02W 30/52* (2015.05)

(58) Field of Classification Search
  CPC ....... B02C 18/24; B02C 18/08; B02C 18/083; B02C 18/12; B09B 3/30–40; B09B 2101/70; Y02W 30/40; Y02W 30/52
  See application file for complete search history.

(56) References Cited

U.S. PATENT DOCUMENTS

| | | | |
|---|---|---|---|
| 9,261,168 B2 * | 2/2016 | Yang | A47J 42/40 |
| 2022/0001389 A1 * | 1/2022 | Maxwell | B02C 18/0092 |
| 2022/0242799 A1 * | 8/2022 | Ying | B02C 18/0084 |
| 2023/0142555 A1 * | 5/2023 | Hotte | B02C 18/0092 |
| | | | 241/18 |

FOREIGN PATENT DOCUMENTS

| | | | | | |
|---|---|---|---|---|---|
| CN | 115110615 | A | * | 9/2022 | ......... B02C 18/0092 |
| JP | 2000-135447 | A | | 5/2000 | |
| JP | 2000-308873 | A | | 11/2000 | |
| JP | 2002-346416 | A | | 12/2002 | |
| JP | 2004-136238 | A | | 5/2004 | |
| JP | 2006-255592 | A | | 9/2006 | |
| JP | 2009-082896 | A | | 4/2009 | |
| KR | 20-0171317 | Y1 | | 3/2000 | |
| KR | 10-2006-0087652 | A | | 8/2006 | |
| KR | 10-0710028 | B1 | | 4/2007 | |
| KR | 10-2009-0121647 | A | | 11/2009 | |
| KR | 10-0934738 | B1 | | 12/2009 | |
| KR | 10-1375322 | B1 | | 3/2014 | |
| KR | 10-2015-0064893 | A | | 6/2015 | |
| KR | 10-2021-0073663 | A | | 6/2021 | |
| KR | 10-2022-0033313 | A | | 3/2022 | |
| KR | 20230116521 | A | * | 8/2023 | ......... B02C 2201/06 |
| KR | 20230143633 | A | * | 10/2023 | ......... B02C 2201/06 |
| WO | WO-2014205752 | A1 | * | 12/2014 | .............. A47J 43/08 |
| WO | WO-2023282443 | A1 | * | 1/2023 | ......... B02C 18/0092 |

OTHER PUBLICATIONS

Supplementary European Search Report dated Feb. 11, 2025, in connection with European Application No. 23835662.0, 7 pages.

* cited by examiner

FOOD WASTE DISPOSER

CROSS-REFERENCE TO RELATED
APPLICATIONS

This application is a Bypass Continuation of International Application No. PCT/KR2023/005638, filed Apr. 26, 2023, which claims priority to Korean Patent Application No. 10-2022-0083393, filed Jul. 6, 2022, and Korean Patent Application No. 10-2022-0106281, filed Aug. 24, 2022, the disclosures of which are herein incorporated by reference in their entirety.

BACKGROUND

1. Field

The present disclosure relates to a food waste disposer including an improved structure.

2. Description of Related Art

A food waste disposer is an apparatus for treating food waste by drying, stirring, and grinding the food waste. The food waste disposer may include a processor for drying, stirring, and grinding food waste.

The processor may include a rotating grinder that rotates inside a grinding case. Food waste treated by the rotating grinder may be discharged to the outside of the processor through a discharge hole formed in the grinding case. The food waste disposer may include a driver for rotating the rotating grinder.

Also, the grinding case may be positioned inside a housing in such a way as to be separable from the housing.

However, because the rotating grinder rotates inside the grinding case in the scenario in which the grinding case is separated from the housing, the rotating grinder may be misaligned from the driver upon installation of the grinding case in the housing.

SUMMARY

An aspect of the disclosure provides a food waste disposer including an improved structure such that a shaft of a driver coupled to a processor that has a rotational degree of freedom.

A food waste disposer according to an embodiment of the disclosure includes: a housing; a grinding case positioned inside the housing, separable from inside of the housing to outside of the housing, and configured to treat food waste; a rotating grinder rotatably coupled with respect to a bottom surface of the grinding case and configured to treat the food waste by rotating inside the grinding case; a grinder rotating shaft configured to be inserted in the rotating grinder and to rotate together with the rotating grinder; and a driver positioned below the grinding case and configured to provide rotation power of the rotating grinder, wherein the driver includes: a driving motor configured to generate power; a shaft driving gear configured to rotate by receiving power of the driving motor; and a connecting shaft configured to be rotatable within a range of a first angle with respect to the shaft driving gear, wherein one end of the connecting shaft is inserted in the grinder rotating shaft and another end of the connecting shaft is inserted in the shaft driving gear to transfer power from the shaft driving gear to the grinder rotating shaft.

The connecting shaft may include: a support body accommodated in the shaft driving gear; and a shaft body extending upward from the support body and inserted in the grinder rotating shaft.

The connecting shaft may further include: an extension body that is extended downward from the support body, inserted in the shaft driving gear, and rotatable inside the shaft driving gear.

The shaft driving gear may include a shaft resting groove, an upper side of the shaft resting groove may open to accommodate the extension body and a cross section of the shaft resting groove may be larger than a cross section of the extension body.

The shaft resting groove may include: a first guide portion including a surface inclined with respect to a reference line passing a center of the shaft resting groove; and a second guide portion that is symmetrical to the first guide portion with respect to the reference line.

The first angle may be an angle formed between an inner surface of the first guide portion and an inner surface of the second guide portion.

The grinder rotating shaft may include a shaft inserting hole that opens downward and in which the shaft body is accommodated, and the shaft body may include a curved surface portion inserted in the shaft inserting hole to be in surface contact with an inner surface of the grinder rotating shaft.

The driver may further include a power transfer gear that connects the driving motor to the shaft driving gear, and the shaft driving gear may include: a gear body that is rotatable; a gear engaging portion formed along a circumferential direction of the gear body and configured to engage with the power transfer gear; and a shaft accommodating portion extending upward along a direction of a shaft of the gear body.

The shaft accommodating portion may include a shaft resting groove depressed inward from an upper surface of the shaft accommodating portion, and wherein the other end of the connecting shaft is accommodated in the shaft resting groove.

The shaft driving gear may include an extension body that extends upward from a gear body toward the connecting shaft, and the connecting shaft may include an extension body resting groove depressed inward from a bottom surface of a shaft body to accommodate the extension body, and a cross section of the extension body resting groove may be larger than a cross section of the extension body.

The grinding case may be configured to be installed from the outside of the housing to the inside of the housing and while the grinding case is installed inside of the housing, the connecting shaft may be rotatable and the one end of the connecting shaft may be inserted into the grinder rotating shaft.

The connecting shaft may include: a plurality of contact portions configured to insert in the grinder rotating shaft and to be in contact with an inner surface of the grinder rotating shaft while inserted; and an edge portion connecting the plurality of contact portions to each other.

The plurality of contact portions may be provided as curved surface portions 5711.

The plurality of contact portions may be include four curved surface portions.

The first angle may be 45 degrees or less.

A food waste disposer according to an embodiment of the disclosure may include a housing. The food waste disposer may include a grinding case positioned inside the housing and configured to be separable from inside of the housing to outside of the housing and treat food waste. The food waste disposer may include a rotating grinder configured to treat the food waste by rotating inside the grinding case and rotatably coupled with respect to a bottom surface of the grinding case. The food waste disposer may include a grinder rotating shaft inserted in the rotating grinder and configured to rotate together with the rotating grinder. The food waste disposer may include a driving motor positioned below the grinding case and configured to provide rotation power of the rotating grinder. The food waste disposer may include a connecting shaft including an extension body inserted in the grinder rotating shaft and extending downward. The food waste disposer may include a shaft driving gear connecting the driving motor to the connecting shaft and including a shaft resting groove opening toward the extension body such that the extension body is rotatable inside the shaft driving gear.

The shaft resting groove may include a first guide portion including a surface inclined with respect to a reference line passing a center of the shaft resting groove; and a second guide portion being symmetrical to the first guide portion with respect to the reference line.

An angle formed between an inner surface of the first guide portion and an inner surface of the second guide portion may be 45 degrees or less.

The grinder rotating shaft may include a shaft inserting hole which opens downward and in which the connecting shaft is accommodated, and the connecting shaft may include a curved surface portion inserted in the shaft inserting hole to be in surface contact with an inner surface of the grinder rotating shaft.

The food waste disposer may further include a heating device positioned between the grinding case and the driver to be in contact with the grinding case, and the grinder rotating shaft may be connected to the connecting shaft by penetrating a shaft penetrating portion of the heating device.

A food waste disposer according to an embodiment of the disclosure may include a rotating grinder rotatably coupled with respect to a bottom surface of a grinding case and configured to treat the food waste by rotating inside the grinding case, a grinder rotating shaft configured to be inserted in the rotating grinder and to rotate together with the rotating grinder and a driver positioned below the grinding case and configured to provide rotation power of the rotating grinder.

The driver may include a driving motor configured to generate power, a shaft driving gear configured to rotate by receiving the power of the driving motor and a connecting shaft configured to be rotatable within a range of a first angle with respect to the shaft driving gear, wherein a first end of the connecting shaft may be configured to be inserted in the grinder rotating shaft and a second end of the connecting shaft may be configured to be inserted in the shaft driving gear to transfer power from the shaft driving gear to the grinder rotating shaft.

The food waste disposer may further include the grinding case that may be configured to be installed inside of a housing such that the grinding case is positioned inside the housing and be separated from inside of the housing and removed to outside of the housing.

While the grinding case is installed inside of the housing, the connecting shaft may be rotatable and the first end of the connecting shaft may rotate to be inserted into the grinder rotating shaft.

The food waste disposer may further include a heating device positioned between the grinding case and the driver to be in contact with the grinding case while the grinding case is installed inside of the housing.

The food waste disposer may further include a second driver.

According to the disclosure, because a connecting shaft of a driver rotates to be inserted into a grinder rotating shaft regardless of a state of the grinder rotating shaft upon insertion of a processor from outside of the housing to inside of the housing, the processor may be easily coupled to the driver.

According to the disclosure, by securing a complete installation state of the processor, power transfer efficiency between the processor and the driver and heat transfer efficiency of a heating device may be secured.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
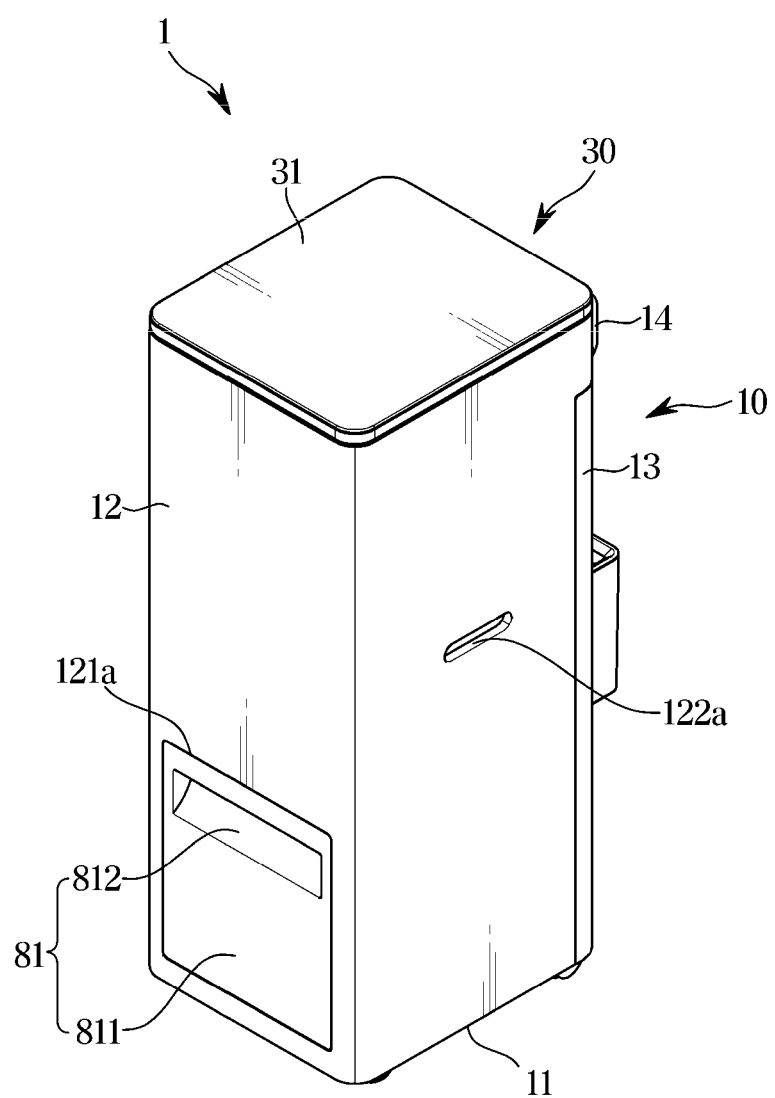
FIG. 1 is a perspective view showing a food waste disposer according to an embodiment of the disclosure in a front direction.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations illustrated in the embodiments and the drawings described in the present specification are embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, an embodiment of the disclosure will be described in detail with reference to the accompanying drawings.

Figure 2:
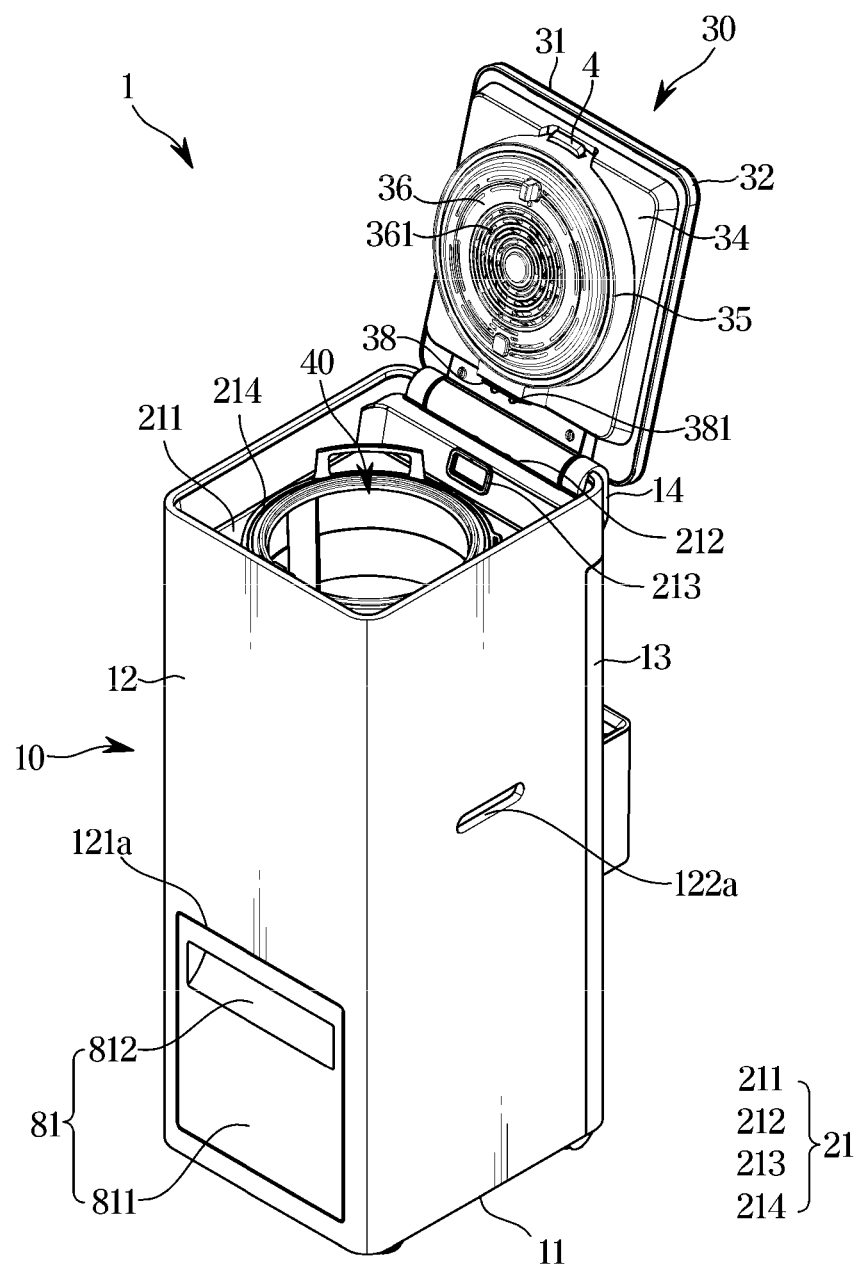
FIG. 2 is a perspective view showing a food waste disposer according to an embodiment of the disclosure in a front direction after a cover device of the food waste disposer opens.
Figure 3:
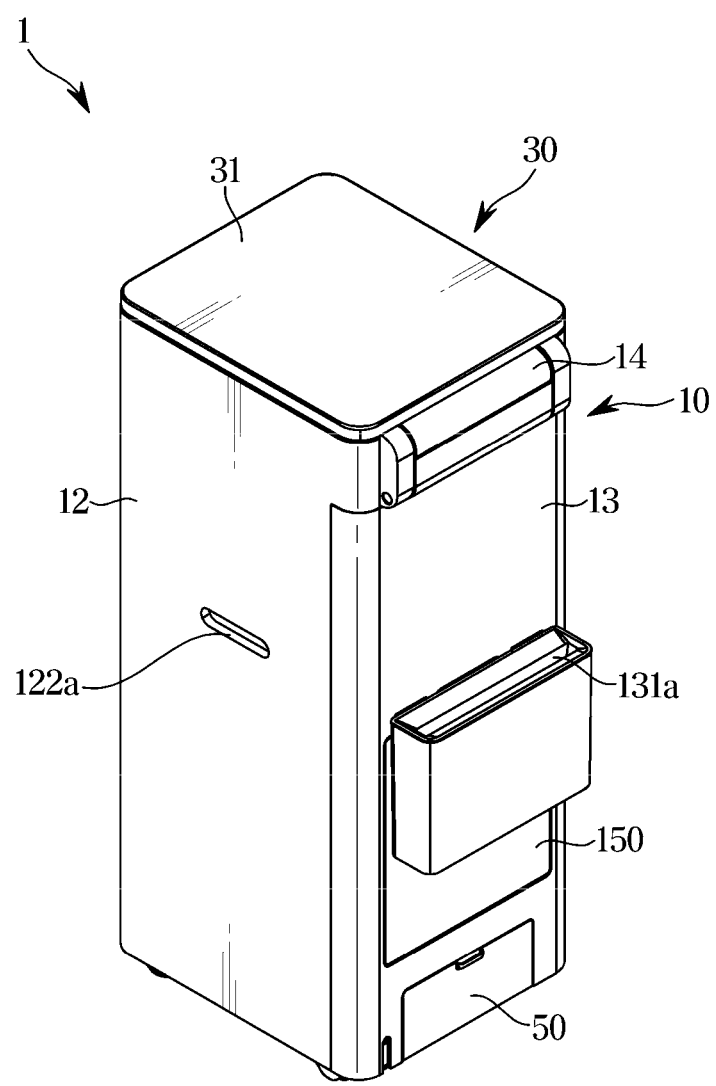
FIG. 3 is a perspective view showing a food waste disposer according to an embodiment of the disclosure in a rear direction.

FIG. 1 is a perspective view showing a food waste disposer according to an embodiment of the disclosure in a front direction. FIG. 2 is a perspective view showing a food waste disposer according to an embodiment of the disclosure in a front direction after a cover device of the food waste disposer opens. FIG. 3 is a perspective view showing a food waste disposer according to an embodiment of the disclosure in a rear direction.

Referring to FIGS. 1 to 3, a food waste disposer 1 may include a housing 10, and a cover device 30 covering an upper portion of the housing 10.

The housing 10 may form an appearance of the food waste disposer 1. For example, the housing 10 may include a base housing 11, and a first cover housing 12 and a second cover housing 13 positioned above the base housing 11.

The base housing 11 may form a bottom surface of the food waste disposer 1, and the first cover housing 12 and the second cover housing 13 may form side surfaces of the food waste disposer 1.

The base housing 11, the first cover housing 12, and the second cover housing 13 may be detachably coupled to each other.

In FIGS. 1 to 3, the first cover housing 12 and the second cover housing 13 are shown to be separate components, although not limited thereto. However, the first cover housing 12 and the second cover housing 13 may be integrated into one body.

A user or an installation engineer may easily access various components positioned inside the food waste disposer 1 by separating the first cover housing 12 and the second cover housing 13 from the base housing 11.

The first cover housing 12 of the food waste disposer 1 may include a storage device accommodating portion 121a and a housing gripping portion 122a.

The storage device accommodating portion 121a may be formed by opening a portion of a front side of the first cover housing 12. The storage device accommodating portion 121a may accommodate a storage case 81 of a storage device 80 which will be described below. The storage case 81 may be withdrawn from the storage accommodating portion 121a in a front direction or inserted into the storage device accommodating portion 121a in a rear direction.

For example, the storage case 81 may be withdrawn from the storage device accommodating portion 121a or inserted into the storage device accommodating portion 121a by sliding along a front-rear direction of the food waste disposer 1.

In a front surface of the storage case 81, a storage gripping portion 812 that may be gripped may be formed.

A storage body 811 of the storage case 81 may form a front surface of the storage case 81. The storage body 811 of the storage case 81 may be exposed to outside of the food waste disposer 1 through the storage device accommodating portion 121 of the first cover housing 12.

The storage gripping portion 812 of the storage case 81 may have a shape depressed in the rear direction from a front surface of the storage body 811 of the storage case 81.

The storage body 811 of the storage case 81 may include a window which is not shown in the drawings. A user may check an amount of food waste collected inside the storage case 81 with his/her naked eye through the window including a transparent material.

The housing gripping portion 122a of the first cover housing 12 may be formed by cutting a portion of the first cover housing 12. The user may move the food waste disposer 1 by gripping the food waste disposer 1 through the housing gripping portion 122a.

The food waste disposer 1 may include a housing exhaust portion 131a provided on a rear side of the second cover housing 13.

The housing exhaust portion 131a may communicate with a filter discharge portion 153 (see FIG. 4) of a filter assembly 150. Accordingly, air filtered in the filter assembly 150 may be discharged to the outside of the food waste disposer 1 through the filter discharge portion 153 and the housing exhaust portion 131a.

A water storage container 50 may be positioned below the filter assembly 150. The water storage container 50 may be detachably installed on the base housing 11. The water storage container 50 may collect condensed water generated in a deodorizing device 100. Details about this will be described below.

The food waste disposer 1 may include a hinge housing 14. The hinge housing 14 may connect the cover device 30 to the housing 10. For example, the hinge housing 14 may be connected to the cover device 30 and coupled to the second cover housing 13. Accordingly, the cover device 30 may be rotatable with respect to the housing 10 through the hinge housing 14.

The cover device 30 may open or close an open upper side of the housing 10. The cover device 30 may be rotatably mounted on the housing 10 to cover the upper side of the housing 10.

For example, the cover device 30 may cover open upper sides of the first cover housing 12 and the second cover housing 13.

The cover device 30 may be mounted on the housing 10 to cover an upper side of a processor 40. The cover device 30 may transfer inside air of the processor 40 to the deodorizing device 100 in a state of closing the housing 10. Details about this will be described below.

Figure 4:
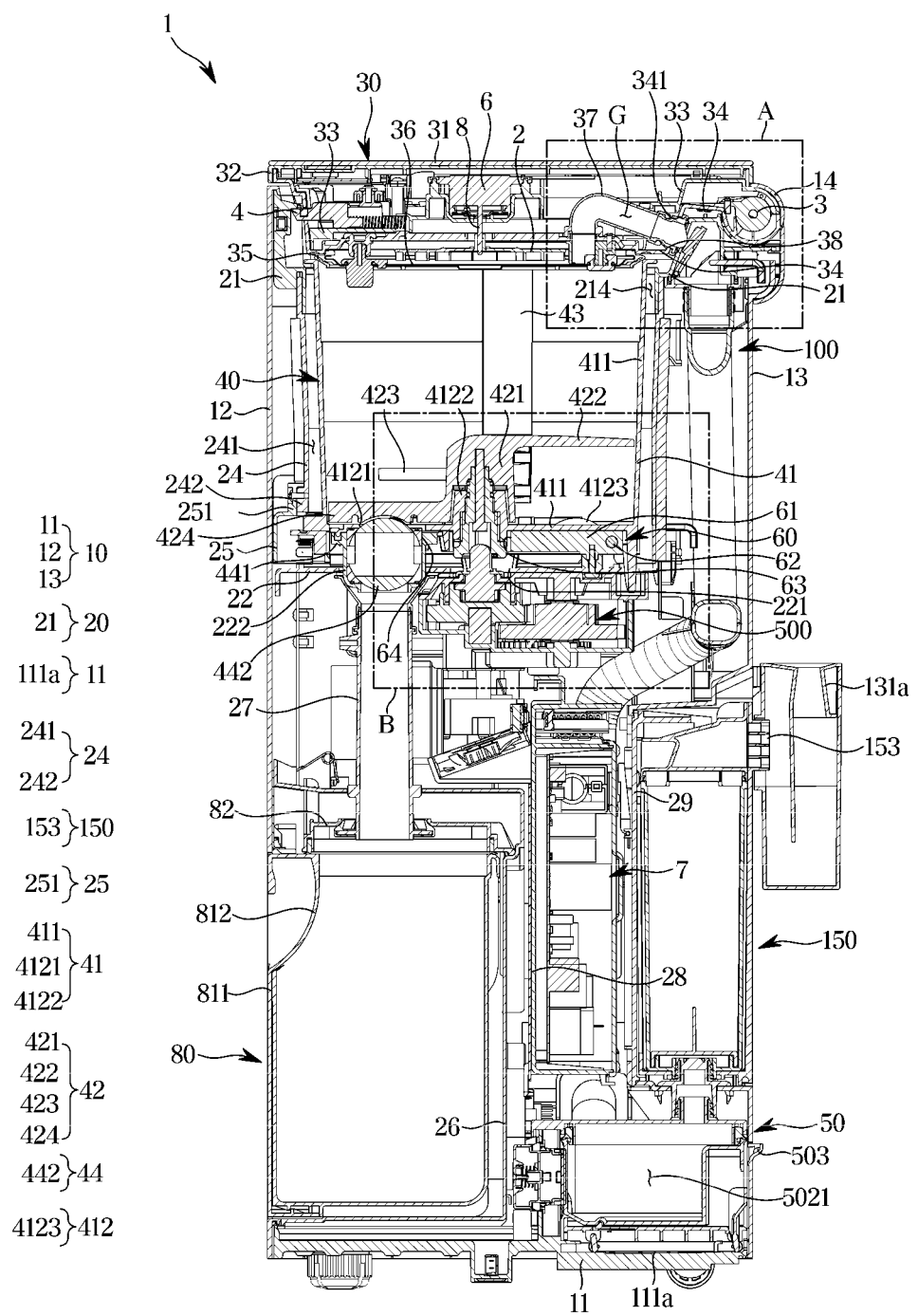
FIG. 4 is a cross-sectional view of a food waste disposer according to an embodiment of the disclosure.
Figure 5:
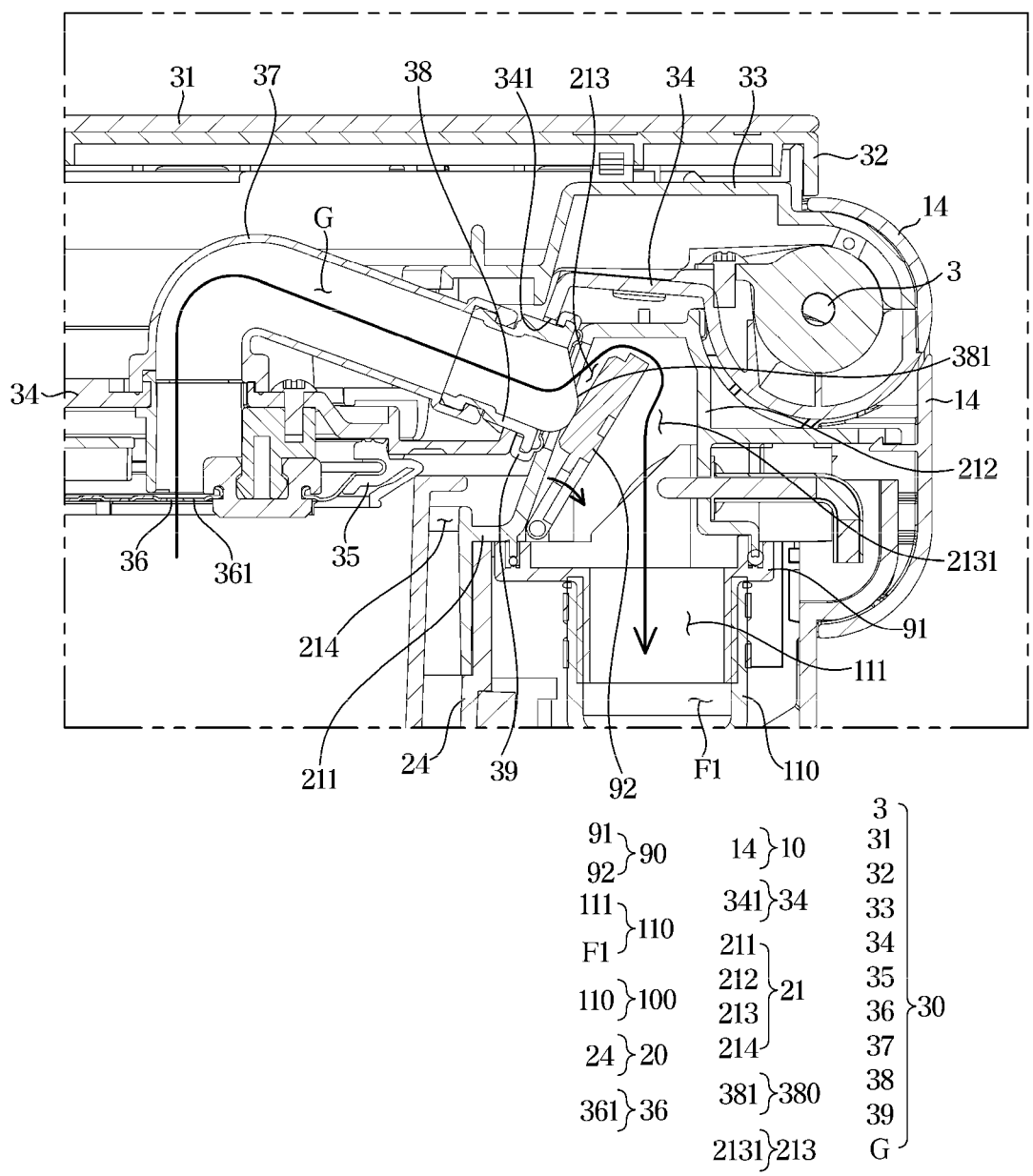
FIG. 5 is an enlarged view showing an A part of FIG. 4.

FIG. 4 is a cross-sectional view of a food waste disposer according to an embodiment of the disclosure. FIG. 5 is an enlarged view showing an A part of FIG. 4.

Hereinafter, an overall configuration of the food waste disposer 1 according to an embodiment of the disclosure will be described with reference to FIGS. 1 to 5.

Referring to FIGS. 4 and 5, the food waste disposer 1 may include the cover device 30 mounted on an outer side of the housing 10 to open or close the upper side of the processor 40, and the processor 40 that is accommodated inside the housing 10.

The cover device 30 may include a top plate 31, an upper frame 32, a middle frame 33, and a lower frame 34.

The top plate 31 may form an upper surface of the food waste disposer 1. For example, in a state in which the cover device 30 closes the upper side of the housing 10, the top plate 31 may be provided as the upper surface of the food waste disposer 1. The top plate 31 may form an upper appearance of the food waste disposer 1.

The upper frame 32, the middle frame 33, and the lower frame 34 may be positioned below the top plate 31. The upper frame 32 may be coupled to the middle frame 33. The middle frame 33 may be coupled to the lower frame 34. The middle frame 33 may be positioned between the upper frame 32 and the lower frame 34.

A certain accommodating space may be formed between the upper frame 32 and the middle frame 33. A certain accommodating space may be formed between the middle frame 33 and the lower frame 34.

For example, the middle frame 33 may be coupled to the upper frame 32 in such a way as to form a space having a certain gap in an up-down direction. Also, the middle frame 33 may be coupled to the lower frame 34 in such a way as to form a space having a certain gap in the up-down direction.

The cover device 30 may include a cover frame 36 and a cover gasket 35.

The cover frame 36 may form a lower surface of the cover device 30. The cover frame 36 may have a size that is accommodated in a food waste inlet corresponding to an upper portion of the processor 40. The cover frame 36 may include an inlet hole 361 (see FIG. 2) to which air flows from the processor 40. Inside air of the processor 40 may flow to a guide duct 37 which will be described below, through the inlet hole 361 of the cover frame 36.

The cover frame 36 may have a shape corresponding to the inlet of the processor 40. Referring to FIG. 2, because the inlet of the processor 40 is in a shape of a circle, the cover frame 36 may also be in a shape of a circle. However, the shape of the cover frame 36 and the inlet of the processor 40 is not limited to this.

The cover gasket 35 may cover an outer edge of the cover frame 36.

The cover gasket 35 may seal between the cover frame 36 and the inlet of the processor 40. The cover gasket 35 may be in contact with an upper edge of the processor 40.

For example, the cover gasket 35 may prevent inside air of the processor 40 from leaking out of the cover device 30 in the state in which the cover device 30 closes the upper portion of the housing 10. Accordingly, the cover gasket 35 may prevent air containing pollutants inside the processor 40 from leaking out of the food waste disposer 1 without passing through the deodorizing device 100.

The cover gasket 35 may be made of a material having certain elasticity.

The cover device 30 may be rotatable with respect to the housing 10 on a cover rotating shaft 3. For example, the cover rotating shaft 3 may be coupled to the hinge housing 14 such that the cover device 30 rotates to open or close the upper portion of the housing 10.

However, an operation of the cover device 30 is not limited to this, and the cover device 30 may slide or be completely separated from the housing 10 to open or close the upper portion of the housing 10, without the hinge housing 14.

The cover device 30 may include a locking member 4.

The locking member 4 may be installed in the middle frame 33. The locking member 4 may be elastically movable along the front-rear direction of the food waste disposer 1.

The locking member 4 may be inserted in an accommodating frame 21 which will be described below. Accordingly, while the cover device 30 closes the upper portion of the housing 10, the locking member 4 may maintain a closed state by the cover device 30.

However, a shape of the locking member 4 is not limited to this, and the locking member 4 may be provided in a shape of a hook to temporarily fix a position of the cover device 30.

The cover device 30 may include a circulating fan 2, a circulating fan rotating shaft 8, and a circulating fan driver 6.

The circulating fan 2 may be positioned between the middle frame 33 and the lower frame 34. The circulating fan driver 6 may be positioned between the upper frame 32 and the middle frame 33.

The circulating fan rotating shaft 8 may connect the circulating fan 2 to the circulating fan driver 6 to transfer power of the circulating fan driver 6 to the circulating fan 2. The circulating fan rotating shaft 8 may be coupled to the circulating fan 2 by penetrating the middle frame 33.

The circulating fan 2 may be provided above the processor 40 to evenly spread internal heat of a grinding case 41 of the processor 40.

For example, according to heating of the processor 40 by a heating device 60 provided below the processor 40, food waste stored in the processor 40 may be heated.

At this time, food waste stored in the processor 40 may be more heated at an area being close to the heating device 60. The food waste stored in the processor 40 may be unevenly heated.

Accordingly, by positioning the circulating fan 2 in the cover device 30, internal heat of the processor 40 may be evenly circulated. In other words, the circulating fan 2 may cause a convection phenomenon inside the grinding case 41.

Accordingly, inside temperature of the grinding case 41 may become nearly uniform regardless of area, and drying efficiency of food waste stored in the grinding case 41 may be improved.

The cover device 30 may include the guide duct 37.

The guide duct 37 may penetrate the lower frame 34. According to a rotation of the cover device 30, the guide duct 37 may rotate together with the cover device 30.

For example, while the cover device 30 closes the upper portion of the housing 10, one end of the guide duct 37 may face inside of the grinding case 41 together with the cover frame 36.

For example, while the cover device 30 closes the upper portion of the housing 10, one end of the guide duct 37 may be toward a down direction.

The guide duct 37 may be installed inside the cover device 30. One end of the guide duct 37 may be fixed to the lower frame 34. The one end of the guide duct 37 may open toward the cover frame 36. Another end of the guide duct 37 may be coupled to a connecting duct 38 which will be described below.

The guide duct 37 may extend in a shape of a curved line. The shape of the guide duct 37 is not limited to this. For example, the shape of the guide duct 37 is not limited as long as the guide duct 37 guides inside air of the grinding case 41 to an exhaust pipe.

The guide duct 37 may form a guide flow path G which air of the processor 40 enters. The guide flow path G may communicate with the processor 40. More specifically, because one end of the guide duct 37 opens toward the cover frame 36, air of the processor 40, entered the inlet hole 361 of the cover frame 36, may enter the guide duct 37.

The cover device 30 may include the connecting duct 38 and a duct sealing member 39.

The connecting duct 38 may be coupled to the other end of the guide duct 37. For example, the connecting duct 38 may be coupled to a rear end of the guide duct 37. The connecting duct 38 may be coupled to a duct installing portion 341 of the lower frame 34.

The connecting duct 38 may connect the guide duct 37 accommodated in the cover device 30 to an exhaust portion 213 formed in the accommodating frame 21. One end of the connecting duct 38 may be connected to the guide duct 37, and another end of the connecting duct 38 may protrude toward outside of the cover device 30 through the duct installing portion 341.

The connecting duct 38 may include a pusher 381. The pusher 381 may protrude outward in the rear direction of the cover device 30.

The pusher 381 may press a blocking member 92 for maintaining a closed state of the exhaust portion 213 of the accommodating frame 21 which will be described below. Details about this will be described below.

The duct sealing member 39 may be coupled to the other end of the connecting duct 38. For example, the duct sealing member 39 may be coupled to a portion of the connecting duct 38, protruding toward the outside of the cover device 30 through the duct installing portion 341.

The duct sealing member 39 may seal between the connecting duct 38 of the cover device 30 and the exhaust portion 213 of the accommodating frame 21. While the cover device 30 closes the upper portion of the housing 10, the duct sealing member 39 may prevent air moved to the connecting duct 38 through the guide duct 37 from leaking to a gap between the connecting duct 38 and the exhaust portion 213. Accordingly, air including pollutants may be prevented from leaking to the outside without passing through the deodorizing device 100.

The processor 40 may be positioned below the cover device 30 to be opened or closed by the cover device 30.

The processor 40 may include the grinding case 41 in which food waste is treated. Food waste treatment may be used as a term meaning a process of drying, stirring, and grinding food waste. Alternatively, food waste treatment may be used as a term meaning a process of drying, stirring, or grinding food waste.

The processor 40 may accommodate food waste. The processor 40 may be positioned inside the housing 10 in such a way as to be detachable from the housing 10. The processor 40 may include a handle portion 413. A user may grip the handle portion 413 to separate the processor 40 from the inside of the housing 10 to the outside of the housing 10.

An upper portion of the grinding case 41 may open to form an inlet. The user may put food waste into the processor 40 through the inlet of the grinding case 41.

The inlet of the grinding case 41 may be closed by the cover frame 36 of the cover device 30. The cover gasket 35 of the cover device 30 may seal a gap between the inlet of the grinding case 41 and the cover frame 36.

The grinding case 41 may include a side wall 411 and a bottom 412.

On the side wall 411 of the grinding case 41, a fixed grinder 43 may be mounted. On the bottom 412 of the grinding case 41, a rotating grinder 42 may be rotatably connected to a first driver 500.

The rotating grinder 42 and the fixed grinder 43 may grind food waste through an interaction.

The rotating grinder 42 may include a rotating body 421 to which a grinder shaft of the first driver 500 is coupled. The rotating grinder 42 may include a first grinder 422, a second grinder 423, and a third grinder 424 that extend in a radial direction from the rotating body 421.

The first grinder 422, the second grinder 423, and the third grinder 424 may be arranged at different heights to stir and grind food waste.

In FIG. 4, the rotating grinder 42 is shown to include the first grinder 422 to the third grinder 424. However, a number of grinders is not limited to this.

In the bottom 412 of the grinding case 41, a discharge hole 4121 may be formed. The discharge hole 4121 may be formed by cutting a portion of the bottom 412 of the grinding case 41. Food waste treated inside the grinding case 41 may be transferred to the storage device 80 through the discharge hole 4121.

In the bottom 412 of the grinding case 41, a rotating shaft accommodating portion 4122 may be formed. The rotating shaft accommodating portion 4122 may extend upward from a center of the grinding case 41. The grinder shaft of the first driver 500 may be inserted in the rotating shaft accommodating portion 4122 to transfer power to the rotating body 421 of the rotating grinder 42.

The processor 40 may include a valve assembly 44.

The valve assembly 44 may include a valve case 441 and a valve member 442.

The valve case 441 may be coupled to a lower portion of the grinding case 41. The valve case 441 may be coupled to the grinding case 41 at a location of communicating with the discharge hole 4121 of the grinding case 41.

The valve case 441 may accommodate the valve member 442 therein. More specifically, the valve case 441 may cover an outer side of the valve member 442 such that the valve member 442 is rotatable inside the valve case 441.

The valve member 442 may be rotatable inside the valve case 441. The valve member 442 may open or close the discharge hole 4121 of the grinding case 41 by rotating.

The valve member 442 may pass through the discharge hole 4121 of the grinding case 41 and protrude upward from the bottom 412 of the grinding case 41. Accordingly, a lower surface of the third grinder 424 of the rotating grinder 42 may be depressed inward to correspond to a protruding shape of the valve member 442. Accordingly, the third grinder 424 may be prevented from interfering with the valve member 442.

Due to the shape of the third grinder 424, a protrusion 4123 may be formed on the bottom 412 of the grinding case 41.

The protrusion 4123 may protrude upward from the bottom 412.

By forming the protrusion 4123 corresponding to the depressed shape of the third grinder 424 on the bottom 412 of the grinding case 41, the third grinder 424 may transfer all food waste collected on the bottom 412 of the grinding case 41 to the discharge hole 4121 and efficiently stir the food waste.

The valve member 442 may be provided in a shape of a ball, wherein a portion of inside of the valve member 442 may open. The valve member 442 may be a ball valve provided in a shape of a ball. The shape of the valve member 442 is not limited to this. The shape of the valve member 442 is not limited as long as the valve member 442 is capable of opening the discharge hole 4121.

The valve member 442 of the valve assembly 44 may rotate by receiving a driving force from a driver 500 or 600. For example, the valve member 442 may rotate by receiving a driving force from a second driver 600 to open or close the discharge hole 4121 of the grinding case 41.

Also, according to a rotation of the valve member 442 to open the discharge hole 4121, the second driver 600 may interfere with an upward movement of the valve member 442 to prevent the valve member 442 from being separated from the second driver 600.

Accordingly, in a scenarios in which a user separates the processor 40 without recognizing an open state of the discharge hole 4121, food waste may be prevented from being discharged. Details about this will be described below.

The food waste disposer 1 may include the heating device 60.

The heating device 60 may include a heating frame 61 and a heating wire 62 accommodated inside the heating frame 61.

The heating frame 61 may be in contact with a lower portion of the processor 40. The heating wire 62 accommodated inside the heating frame 61 may heat the bottom 412 of the processor 40.

The food waste disposer 1 may include the drivers 500 and 600.

The drivers 500 and 600 may be positioned below the heating device 60.

Figure 6:
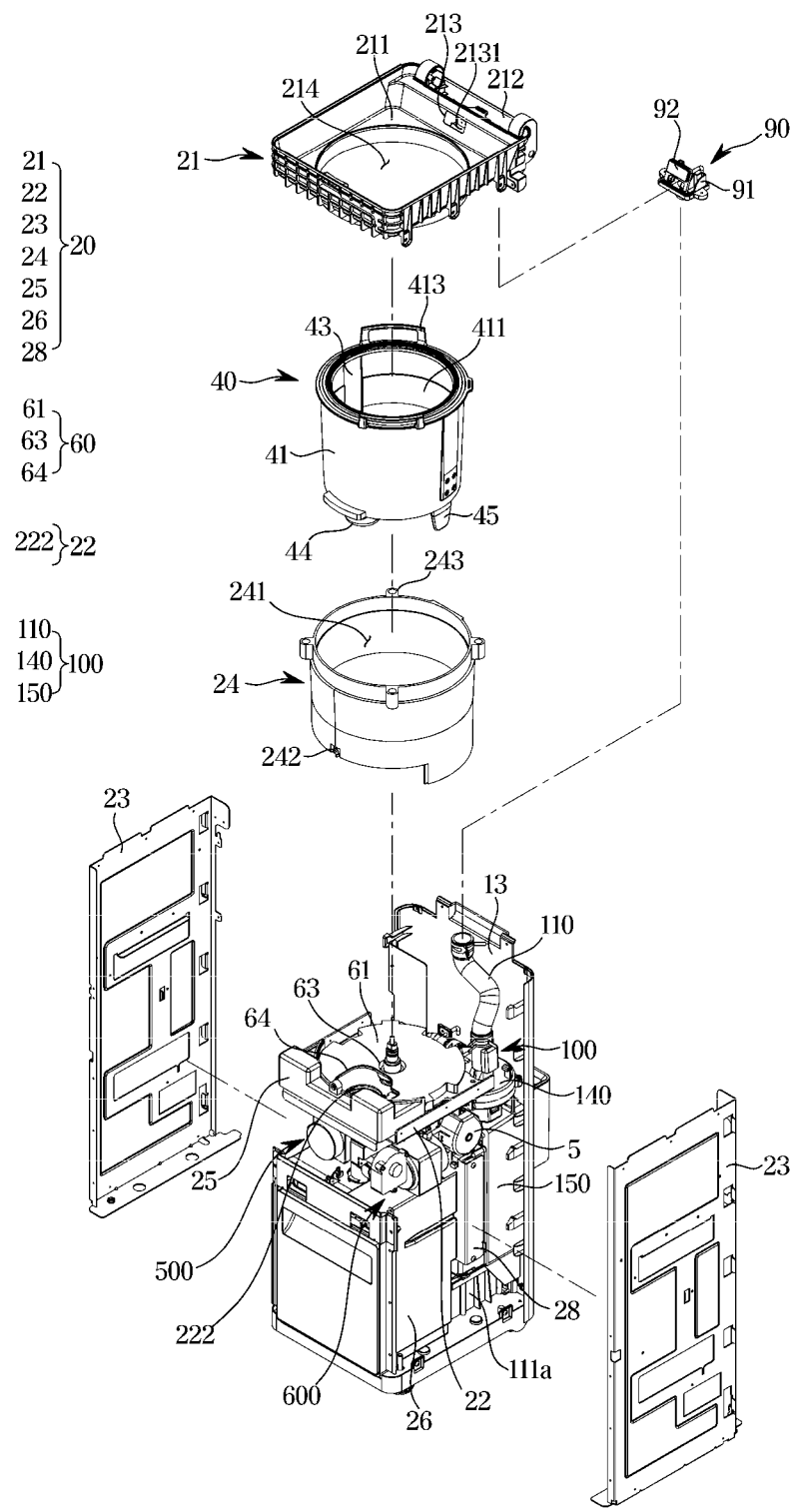
FIG. 6 is an exploded view showing some components of a food waste disposer according to an embodiment of the disclosure in the front direction.

The drivers 500 and 600 may include the first driver 500 (see FIG. 6) and the second driver 600 (see FIG. 6).

The first driver 500 may transfer a driving force to the rotating grinder 42 of the processor 40, and the second driver 600 may transfer a driving force to the valve assembly 44 of the processor 40. Details about this will be described below.

The food waste disposer 1 may include the storage device 80.

The storage device 80 may be positioned inside a storage frame. The storage device 80 may be connected to a transfer tube 27.

An upper end of the transfer tube 27 may be connected to the valve assembly 44, and a lower end of the transfer tube 27 may be connected to the storage device 80.

Food waste treated in the processor 40 may be transferred to the transfer tube 27 while the valve assembly 44 opens the discharge hole 4121. The food waste transferred to the transfer tube 27 may be stored in the storage device 80.

The storage device 80 may be positioned below a front portion of the processor 40 to store food waste treated in the processor 40.

The storage device 80 may include the storage case 81, and the storage body 811 coupled to the storage case 81 and exposed to the outside of the food waste disposer 1. In an upper end of the storage body 811, the storage gripping portion 812 may be formed. Accordingly, a user may separate the storage device 80 from the housing 10 by gripping the storage gripping portion 812 to empty food waste collected in the storage device 80 from the storage device 80.

The food waste disposer 1 may include an electronic component portion 7.

Electronic components such as various circuit boards may be positioned in the electronic component portion 7.

The food waste disposer 1 may include a controller. The controller may control various components of the food waste disposer 1. Accordingly, the controller may control an operation of the food waste disposer 1 based on an electronic signal. Details about this will be described below.

The food waste disposer 1 may include an exhaust portion opening/closing device 90.

The exhaust portion opening/closing device 90 may include a frame coupling body 91 and a blocking member 92. The blocking member 92 may open or close the exhaust portion 213 of the accommodating frame 21. The blocking member 92 may be at a position of closing the exhaust portion 213 while the cover device 30 opens the upper portion of the housing 10.

The frame coupling body 91 may be connected to an end of a first exhaust pipe 110 which will be described below. The frame coupling body 91 may be coupled to a lower portion of the accommodating frame 21.

The frame coupling body 91 may connect the accommodating frame 21 to the first exhaust pipe 110. The frame coupling body 91 may form a communicating space 2131 therein. The communicating space 2131 may communicate with the guide flow path G of the guide duct 37. The communicating space 2131 may communicate with a first exhaust flow path F1 of the first exhaust pipe 110.

The blocking member 92 may be elastically supported on the frame coupling body 91. The blocking member 92 may be coupled to the frame coupling body 91 to be maintained in a state of closing the exhaust portion 213 of the accommodating frame 21. The blocking member 92 may be movable inside the communicating space 2131.

The food waste disposer 1 may include the deodorizing device 100.

The deodorizing device 100 may be connected to the cover device 30. The deodorizing device 100 may include the first exhaust pipe 110 connected to the cover device 30.

The first exhaust pipe 110 may include a first inlet 111 connected to the communicating space 2131 of the frame coupling body 91. The first exhaust pipe 110 may form the first exhaust flow path F1 through which air of the processor 40 flows.

The deodorizing device 100 may be positioned in a rear portion of the food waste disposer 1 to suck air from the processor 40, filter the air, and then discharge the filtered air to the outside.

Details about the deodorizing device 100 will be described below.

The food waste disposer 1 may include the water storage container 50.

The water storage container 50 may be positioned in the base housing 11 to collect condensed water generated in the exhaust flow path of the deodorizing device 100.

For example, the water storage container 50 may be installed in a water storage container installing portion 111a of the base housing 11. The water storage container 50 may form a collecting space 5021 therein. The water storage container 50 may be positioned below the filter assembly 150 and connected to the filter assembly 150.

A flow of air in a state in which the cover device 30 closes the upper portion of the housing 10 will be described with reference to FIG. 5.

As shown in FIG. 5, while the cover device 30 closes the upper portion of the housing 10, the pusher 381 formed in the connecting duct 38 may press the blocking member 92 positioned inside the accommodating frame 21.

For example, the pusher 381 may press the blocking member 92 by passing through the exhaust portion 213 of the accommodating frame 21. According to a rotation of the blocking member 92 pressed toward the communicating space 2131, the blocking member 92 may open the exhaust portion 213 of the accommodating frame 21.

While the blocking member 92 opens the exhaust portion 213 of the accommodating frame 21, inside of the connecting duct 38 may be connected to the communicating space 2131 such that air flows through the inside of the connecting duct 38 and the communicating space 2131.

Also, because the communicating space 2131 communicates with the first inlet 111 of the first exhaust pipe 110, the pusher 381 may open the first inlet 111 of the first exhaust pipe 110 by pressing the blocking member 92.

That is, while the cover device 30 closes the upper portion of the housing 10, the blocking member 92 may elastically move to a position of opening the exhaust portion 213.

Accordingly, inside air of the processor 40 may flow to the cover device 30 through the inlet hole 361 of the cover frame 36 of the cover device 30. Air passed through the inlet hole 361 may flow to the guide duct 37 of the cover device 30. In other words, air of the processor 40 may flow along the guide flow path G.

Thereafter, air passed through the guide duct 37 and the connecting duct 38 may enter the communicating space 2131 through the open exhaust portion 213 of the accommodating frame 21.

The air entered the communicating space 2131 may flow along the first exhaust flow path F1 through the first inlet 111 of the first exhaust pipe 110. The flow of air may be formed by an exhaust fan 140 which will be described below.

Figure 7:
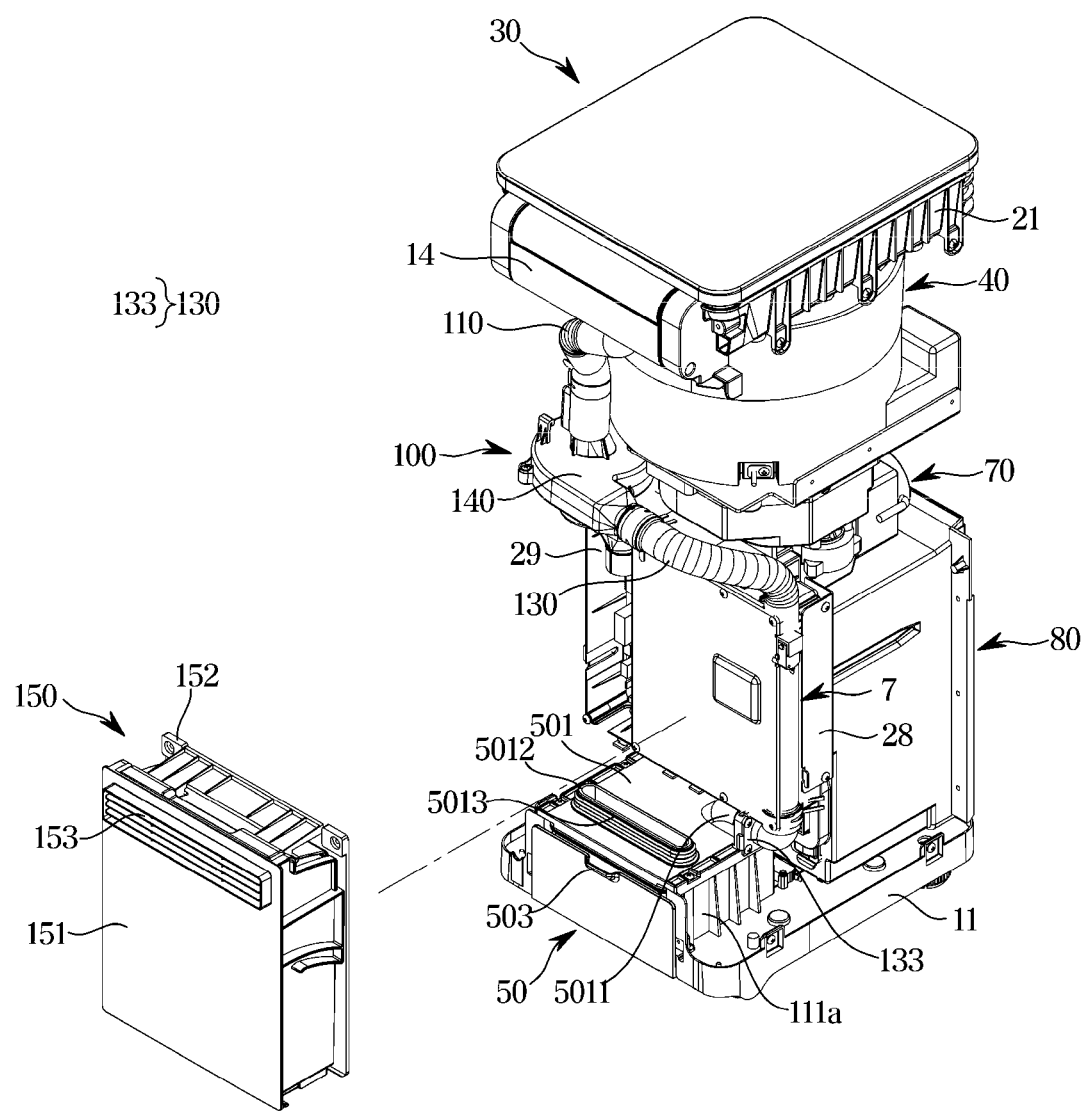
FIG. 7 is an exploded view showing some components of a food waste disposer according to an embodiment of the disclosure in the rear direction.

FIG. 6 is an exploded view showing some components of a food waste disposer according to an embodiment of the disclosure in the front direction. FIG. 7 is an exploded view showing some components of a food waste disposer according to an embodiment of the disclosure in the rear direction.

The food waste disposer 1 may include a plurality of internal frames 20. In FIG. 6, for convenience of description, the cover device 30 and the first cover housing 12 are not shown.

Hereinafter, detailed structures of the internal frames 20 of the food waste disposer 1 and an arrangement of various devices will be described.

Referring to FIGS. 6 and 7, the food waste disposer 1 may include the accommodating frame 21. The plurality of internal frames 20 includes the accommodating frame 21.

The accommodating frame 21 may include a base portion 211, a hinge installing portion 212, an exhaust portion 213, and an opening 214.

The accommodating frame 21 may be positioned between the housing 10 and the processor 40 to cover the outer side of the processor 40. For example, the base portion 211 of the accommodating frame 21 may be positioned between the housing 10 and the processor 40 to cover the outer side of the processor 40.

The hinge installing portion 212 may be formed behind the base portion 211. The hinge housing 14 may be coupled to the hinge installing portion 212 of the accommodating frame 21. The cover device 30 may be coupled to the hinge installing portion 212 of the accommodating frame 21 to be rotatable.

The exhaust portion 213 may be formed behind the base portion 211. The exhaust portion 213 may connect the guide flow path G of the cover device 30 to the exhaust flow path of the deodorizing device 100.

The exhaust portion 213 may communicate with the guide flow path G and the exhaust flow path. The exhaust portion 213 may be formed by cutting a portion of an inner portion of the base portion 211.

The accommodating frame 21 may include the communicating space 2131 connected to the exhaust portion 213. The communicating space 2131 may be formed behind the accommodating frame 21. The exhaust portion opening/closing device 90 may be accommodated in the communicating space 2131.

The opening 214 may open at an inner area of the base portion 211. The processor 40 may be separated from the accommodating frame 21 through the opening 214. The opening 214 may communicate with the inlet of the processor 40.

The food waste disposer 1 may include a support frame 22, a case frame 24, and a fixing frame 25.

The support frame 22 may be positioned below the heating device 60 and support the heating device 60 and the processor 40. The fixing frame 25 may be positioned on a front portion of the support frame 22. The fixing frame 25 may include a frame fixing portion 251 coupled to the case frame 24.

The case frame 24 may accommodate the processor 40. The case frame 24 may have a shape corresponding to the processor 40. For example, the case frame 24 may be in a shape of a cylinder of which an upper side and a lower side open.

The case frame 24 may include a grinding device accommodating space 241. The processor 40 may be positioned in the grinding device accommodating space 241 in such a way as to be spaced a preset distance from the case frame 24.

The case frame 24 may include a case fixing portion 242. The case fixing portion 242 may be coupled to the frame fixing portion 251 of the fixing frame 25. Accordingly, the case frame 24 may be fixed with respect to the fixing frame 25.

The case frame 24 may include a frame coupling portion 243. The case frame 24 may be coupled to the lower portion of the accommodating frame 21 by the frame coupling portion 243. Accordingly, the case frame 24 may be fixed with respect to the accommodating frame 21.

The food waste disposer 1 may include a side frame 23. A pair of side frames 23 may be provided.

The pair of side frames 23 may face each other. The side frames 23 may be coupled to both side surfaces of the accommodating frame 21. The side frames 23 may be coupled to the second cover housing 13.

The side frames 23 may be positioned at left and right sides of the food waste disposer 1 to cover the processor 40, the heating device 60, the drivers 500 and 600, the storage device 80, and the deodorizing device 100.

Referring to FIGS. 4 and 6, the food waste disposer 1 may include a storage frame 26.

The storage frame 26 may form a space in which the storage device 80 is accommodated. The storage frame 26 may be connected to the transfer tube 27.

In an unexpected case in which food waste is transferred through the transfer tube 27 in a state in which the storage device 80 is not accommodated inside the housing 10, or food waste is discharged from the storage device 80 upon withdrawal of the storage device 80 by a user, the storage frame 26 may prevent the food waste from influencing other internal components of the food waste disposer 1.

The storage frame 26 may accommodate a storage cover 82 of the storage device 80. The storage cover 82 may cover an open upper side of the storage case 80.

Also, the storage cover 82 may be rotatable with respect to an upper surface of the storage case 81 to be inclined toward the rear direction upon withdrawal of the storage case 81 in the front direction from the housing 10 and inclined in the front direction upon insertion of the storage case 81 into the housing 10 to seal the upper surface of the storage case 81.

The food waste disposer 1 may include a first partition plate 28 positioned behind the storage device 80 to partition the electronic component portion 7.

The drivers 500 and 600 of the food waste disposer 1 may include the first driver 500 and the second driver 600.

The first driver 500 may include the grinder shaft penetrating a center of the heating device 60 and extending upward to provide power to the rotating grinder 42.

The second driver 600 may provide power to the valve assembly 44. Each of the first driver 500 and the second driver 600 may be controlled by the controller.

The heating device 60 may include a first shaft penetrating portion 63 and a first valve penetrating portion 64. The support frame 22 may include a second shaft penetrating portion 221 and a second valve penetrating portion 222.

The first shaft penetrating portion 63 and the second shaft penetrating portion 221 may be aligned in the up-down direction. The first valve penetrating portion 64 and the second valve penetrating portion 221 may be aligned in the up-down direction.

The grinder shaft of the first driver 500 may penetrate the first shaft penetrating portion 63 and the second shaft penetrating portion 221. Accordingly, the first driver 500 may pass through the support frame 22 and the heating device 60 to transfer a driving force to the processor 40.

Because the valve assembly 44 of the processor 40 protrudes downward from the grinding case 41, the valve assembly 44 may protrude below the heating device 60 and the support frame 22 through the first valve penetrating portion 64 and the second valve penetrating portion 222.

The valve assembly 44 protruding below the heating device 60 and the support frame 22 may be driven by the second driver 600.

The valve member 442 of the valve assembly 44 may rotate by the second driver 600 to open or close the discharge hole 4121 of the grinding case 41.

The food waste disposer 1 may include a cooling fan 5.

The cooling fan 5 may be positioned below the heating device 60.

The cooling fan 5 may circulate inside air of the housing 10 to discharge internal heat of the housing 10 to the outside. The cooling fan 5 may be positioned to one side of the drivers 500 and 600. The cooling fan 5 may be positioned in front of the exhaust fan 140.

The deodorizing device 100 may be positioned at a rear area of the processor 40. The deodorizing device 100 may be positioned on an inner side of the second cover housing 13.

Referring to FIGS. 6 and 7, the deodorizing device 100 may include the first exhaust pipe 110, the exhaust fan 140, a second exhaust pipe 130, and the filter assembly 150.

The exhaust fan 140 may be positioned inside the housing 10 to form a flow of air. The exhaust fan 140 may be positioned in a rear area of the housing 10. The exhaust fan 140 may suck air from the processor 40. The first exhaust pipe 110 and the second exhaust pipe 110 may be connected to the exhaust fan 140.

The first exhaust pipe 110 may be connected to the exhaust fan 140 at an upstream side of the exhaust fan 140, and the second exhaust pipe 130 may be connected to the exhaust fan 140 at a downstream side of the exhaust fan 140. The first exhaust pipe 110 may be connected to the exhaust fan 140 to form the first exhaust flow path F1 (see FIG. 5) communicating with the guide flow path G.

The first exhaust pipe 110 may form the first exhaust flow path F1 (see FIG. 5). The second exhaust pipe 130 may form a second exhaust flow path. The first exhaust flow path F1 and the second exhaust flow path may be collectively referred to as exhaust flow paths.

Air entered the first exhaust pipe 110 and the second exhaust pipe 130 from the processor 40 by the exhaust fan 140 may flow along the first exhaust pipe 110 and the second exhaust pipe 130.

The filter assembly 150 may adsorb pollutants from air flowing along the first exhaust pipe 110 and the second exhaust pipe 130. A filter for filtering pollutants in air may be provided inside the filter assembly 150.

The filter assembly 150 may be connected to the exhaust flow paths through the exhaust pipes to adsorb pollutants from air flowing along the first exhaust flow path F1 and the second exhaust flow path.

Air entered the first exhaust pipe 110 and the second exhaust pipe 130 from the processor 40 may flow along the exhaust flow paths. The filter assembly 150 may be connected to the exhaust flow paths. More specifically, the filter assembly 150 may be connected to the exhaust flow paths through the first exhaust pipe 110 and the second exhaust pipe 130.

The water storage container 50 may be connected to the filter assembly 150 and the second exhaust pipe 130. Accordingly, air flowing along the second exhaust pipe 130 may pass through the inside of the water storage container 50 and then flow to the filter assembly 150.

The water storage container 50 may be installed in the water storage container installing portion 111a of the base housing 11. The water storage container 50 may include a water storage cover 501.

The water storage cover 501 may form an upper surface of the water storage container 50. The water storage cover 501 may include a connecting pipe coupling portion 5011 connected to the second exhaust pipe 130. For example, the connecting pipe coupling portion 5011 of the water storage cover 501 may be coupled to a coupling flange 133 of the second exhaust pipe 130.

The water storage cover 501 may include a filter coupling portion 5012. The filter coupling portion 5012 may extend upward from the water storage cover 501 to be connected to a lower portion of the filter assembly 150. The filter coupling portion 5012 may form a path along which air entered the water storage container 50 through the second exhaust pipe 130 flows to the filter assembly 150.

The water storage container 50 may include a filter sealing member 5013 coupled to the filter coupling portion 5012. The filter sealing member 5013 may seal a gap between the water storage container 50 and the filter assembly 150.

The water storage container 50 may include a gripping portion 503. The gripping portion 503 may be exposed to an outer side of the second cover housing 13 of the food waste disposer 1. A user may separate the water storage container 50 from the housing 10 by gripping the gripping portion 503 to remove collected, condensed water.

The filter assembly 150 may include a filter case 151 in which a filter is accommodated. The filter case 151 may be coupled to a filter installing plate 152. The filter installing plate 152 may be coupled to the second partition plate 29 that partitions the electronic component portion 7 from behind.

A filter discharge portion 153 may be formed in a rear portion of the filter case 151. Air flowing along the first exhaust pipe 110 and the second exhaust pipe 130 may pass through the inside of the water storage container 50 to flow to the filter assembly 150, and then, pollutants of the air may be removed by the filter assembly 150 and discharged to the outside of the food waste disposer 1 through the filter discharge portion 153.

Figure 8:
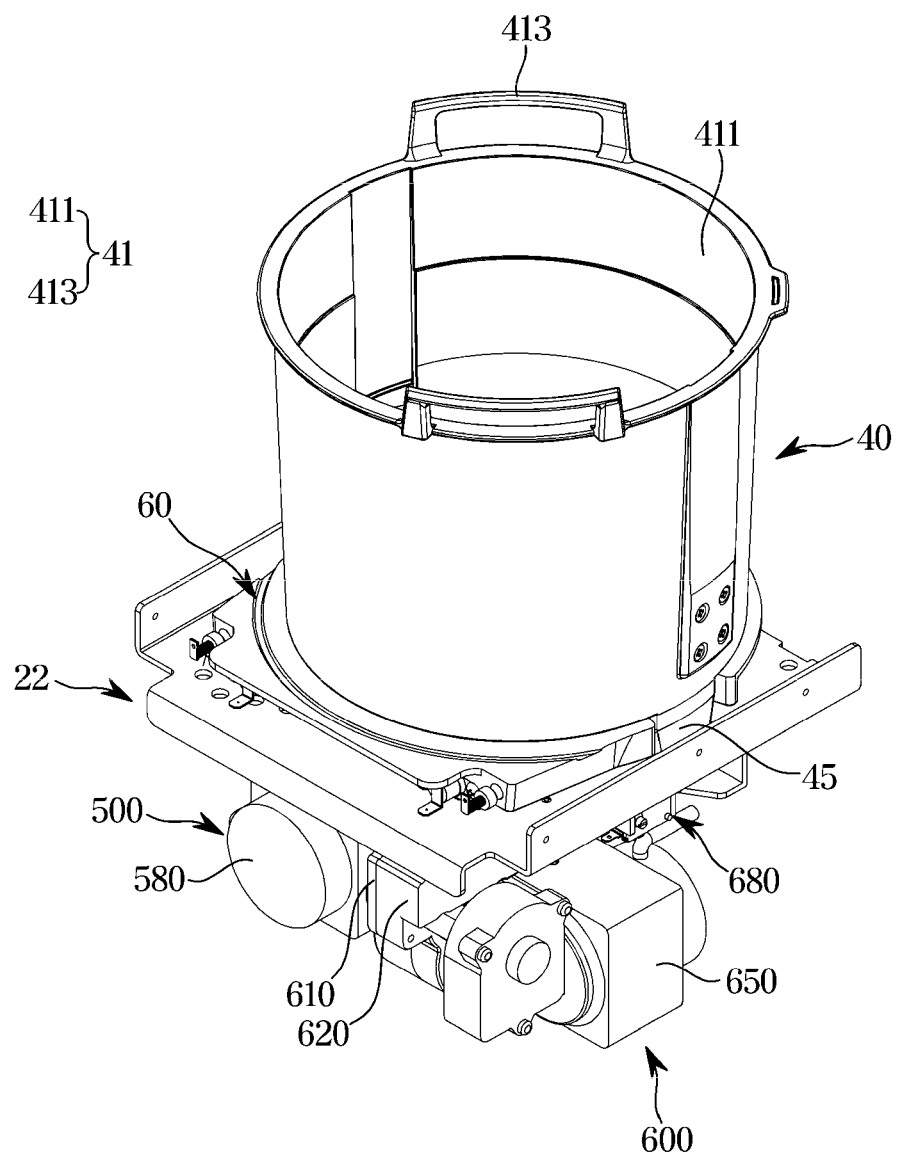
FIG. 8 shows a coupled state of a processor according to an embodiment of the disclosure, a heating device, a support frame, and a driving device.
Figure 9:
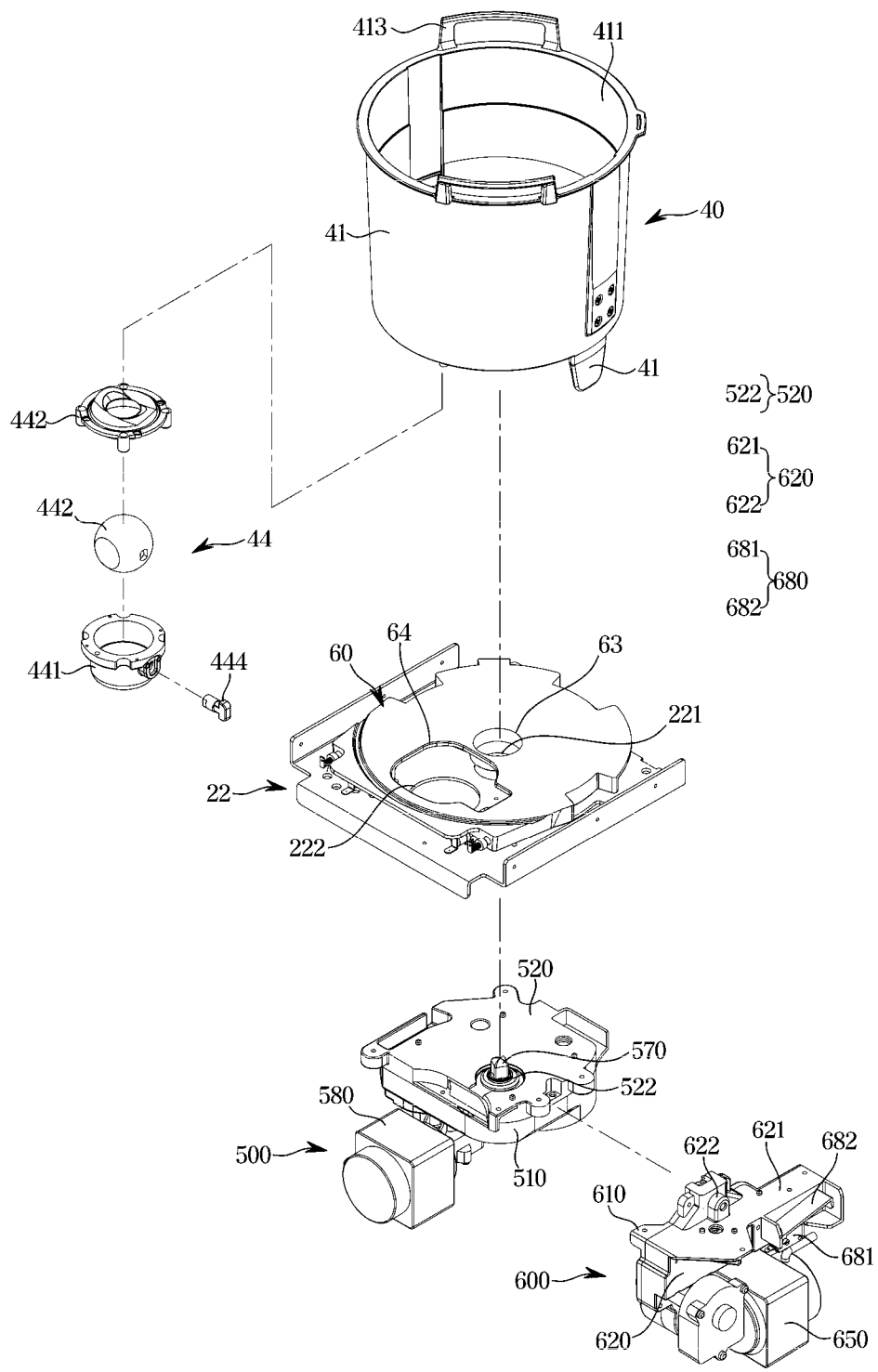
FIG. 9 is an exploded view of components shown in FIG. 8.

FIG. 8 shows a coupled state of a processor according to an embodiment of the disclosure, a heating device, a support frame, and a driving device. FIG. 9 is an exploded view of components shown in FIG. 8.

Referring to FIGS. 8 and 9, the food waste disposer 1 may include the grinding case 41 positioned inside the housing 10 to treat food waste, wherein the discharge hole 4121 (see FIG. 4) is formed in the bottom of the grinding case 41.

The grinding case 41 may include a handle portion 413 extending upward from the side wall 411. A user may separate the processor 40 from the inside of the housing 10 to the outside by gripping the handle portion 413.

The grinding case 41 may include a case extension portion 45 extending downward from the side wall 411 of the grinding case 41. The case extension portion 45 may press an installation sensor 680 which will be described below to be detected by the installation sensor 680.

The food waste disposer 1 may include the valve assembly 44 including the valve member 442 installed in the lower portion of the grinding case 41 and configured to open or close the discharge hole 4121.

The valve assembly 44 may include the valve case 441, the valve member 442, and a valve shaft 444.

A plurality of valve cases 441 may be provided in such a way as to be coupled to each other in the up-down direction and accommodate the valve member 442 therein. An upper portion of the valve case 441 may be inserted in the inside of the grinding case 41 to cover the discharge hole 4121 formed in the bottom 412. In a lower portion of the valve case 441, a cut portion in which the valve shaft 444 is inserted may be formed.

The valve member 442 may be accommodated in the valve case 441 and rotate. The valve member 442 may be in a shape of a ball including an open portion. However, the shape of the valve member 442 is not limited to this. The shape of the valve member 442 is not limited as long as the valve member 442 is capable of opening or closing the discharge hole 4121.

A portion of a side surface of the valve member 442 may be depressed such that the valve shaft 444 is inserted in the portion of the side surface of the valve member 442. The valve shaft 444 may be connected to the valve member 442 by penetrating the valve case 441.

One side of the valve shaft 444 may be connected to the valve member 442 to rotate the valve member 442, and another side of the valve member 444 may be connected to a holding member 640 (see FIG. 11) of the second driver 600, which will be described below, to receive power from a second driving motor 650.

The valve shaft 444 may connect the valve member 442 to the holding member 640.

A valve sealing member (not shown) for securing airtightness may be positioned between the valve case 441 and the valve member 442. Accordingly, while the valve member 442 closes the discharge hole 4121, water of food waste, etc. may be prevented from leaking out of the processor 40 through a gap between the valve member 442 and the valve case 441.

The processor 40 may penetrate the heating device 60 and the support frame 22.

The support frame 22 may be positioned below the heating device 60 to support the heating device 60 and the processor 40. The support frame 22 may include a first shaft penetrating portion 221 and a first valve penetrating portion 222.

A connecting shaft 570 may penetrate the first shaft penetrating portion 221 such that the first driver 500 rotates the rotating grinder 42 of the processor 40. For example, the first shaft penetrating portion 221 may be formed by cutting a portion of the support frame 22.

The first valve penetrating portion 222 may be positioned in front of the first shaft penetrating portion 221. The valve assembly 44 of the processor 40 may pass through the first valve penetrating portion 222.

The heating device 60 may include a second shaft penetrating portion 63 and a second valve penetrating portion 64.

The second shaft penetrating portion 63 may be arranged above the first shaft penetrating portion 221. The connecting shaft 570 may penetrate the second shaft penetrating portion 63 for the first driver 500 to rotate the rotating grinder 42 of the processor 40. For example, the second shaft penetrating portion 63 may be formed by cutting a portion of the heating frame 61 of the heating device 60.

The second valve penetrating portion 64 may be arranged above the second shaft penetrating portion 63. The second valve penetrating portion 64 may be positioned in front of the second shaft penetrating portion 63. The valve assembly 44 of the processor 40 may pass through the second valve penetrating portion 64.

Because the valve assembly 44 protrudes downward from the grinding case 41, the bottom 412 of the grinding case 41 may be in contact with an upper surface of the heating device 60 to receive heat, and the valve assembly 44 may be connected to the second driver 600 by passing through the second valve penetrating portion 64 of the heating device 60 and the first valve penetrating portion 222 of the support frame 22.

The food waste disposer 1 may include the first driver 500.

The first driver 500 may be positioned below the grinding case 41 to operate the rotating grinder 42.

The first driver 500 may include a first driving motor 580 for generating power.

The first driver 500 may include a case. The case may include a first driving case 510 and a first cover case 520. The first driving motor 580 may be coupled to one side of the case to provide power.

The first driver 500 may include the connecting shaft 570 to transfer power to the rotating grinder 42 of the processor 40. The connecting shaft 570 may protrude upward from the first cover case 520 by penetrating a shaft penetrating portion 522 of the first cover case 520. Details about the first driver 500 will be described below.

The food waste disposer 1 may include the second driver 600.

The second driver 600 may be positioned to one side of the valve assembly 44 to operate the valve assembly 44.

The second driver 600 may include the second driving motor 650 for generating power.

The second driver 600 may include a case. The case may include a second driving case 610 and a second cover case 620. The second driving motor 650 may be coupled to one side of the case to provide power.

The second driver 600 may include the holding member 640 for transferring power to the valve assembly 44 of the processor 40. The holding member 640 may include a shaft passing groove 6411 that accommodates the valve shaft 444 of the valve assembly 44. The holding member 640 may rotate the valve member 442 connected to the valve shaft 444 by rotating the valve shaft 444.

Figure 10:
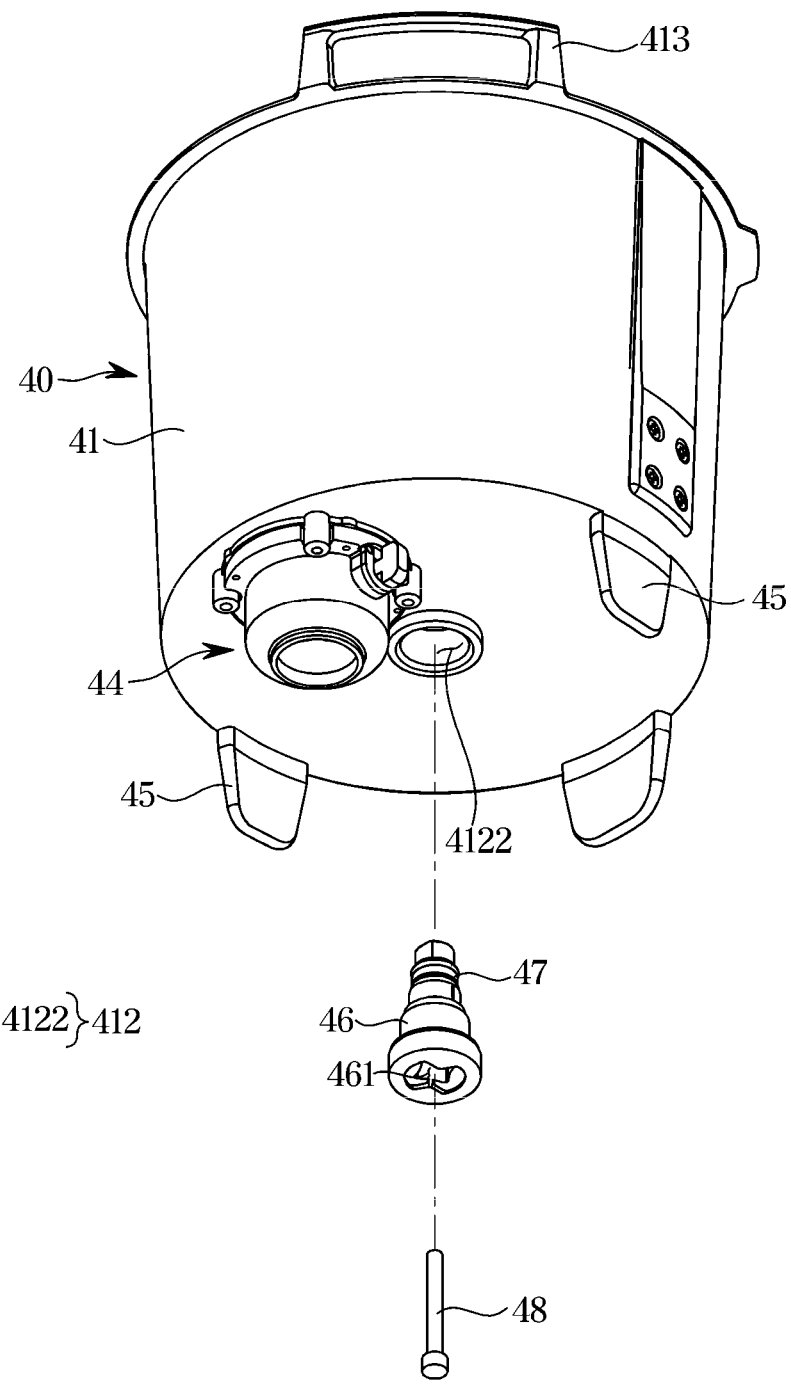
FIG. 10 is an exploded view showing the processor shown in FIG. 8 from below.

FIG. 10 is an exploded view showing the processor shown in FIG. 8 from below.

Referring to FIG. 10, the processor 40 may include the grinding case 41 positioned in the housing 10 in such a way as to be separable from the inside of the housing 10 to the outside, and configured to treat food waste.

Inside the grinding case 41, the rotating grinder 42 rotatably coupled with respect to the bottom 412 of the grinding case 41 to treat food waste while rotating inside the grinding case 41 may be provided.

In the bottom 412 of the grinding case 41, a driving shaft installing portion 4122 may be formed. A rotating shaft accommodating groove 4211 of the rotating grinder 42 may be rotatably coupled to an outer side of the driving shaft accommodating portion 4122. A grinder rotating shaft 46 may be rotatably coupled to an inner side of the driving shaft installing portion 4122.

The processor 40 may include the grinder rotating shaft 46 inserted in the rotating grinder 42 and rotating together with the rotating grinder 42.

The grinder rotating shaft 46 may include a shaft inserting hole 461 opening downward and accommodating the connecting shaft 570 which will be described below.

The processor 40 may include a bearing member 47 and a fixing member 48.

The bearing member 47 may be coupled to an outer surface of the grinder rotating shaft 46 and positioned between the grinder rotating shaft 46 and the rotating body 421 of the rotating grinder 42.

The fixing member 48 may be inserted in inside of the grinder rotating shaft 46 to fix a position of the grinder rotating shaft 46. The fixing member 48 may be in a shape of a bar extending in the up-down direction.

Figure 11:
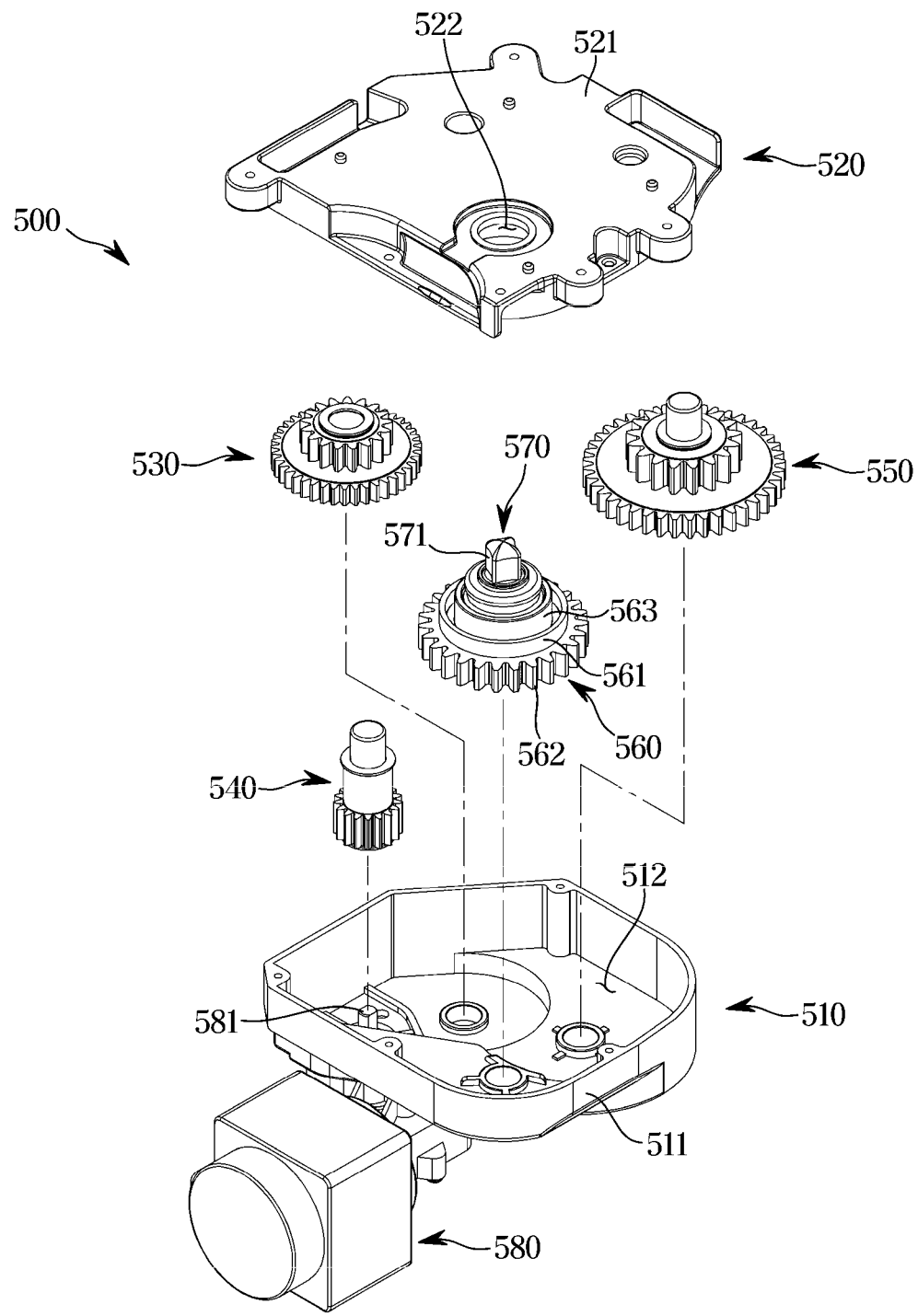
FIG. 11 is an exploded view showing components of a first driver shown in FIG. 8.
Figure 12:
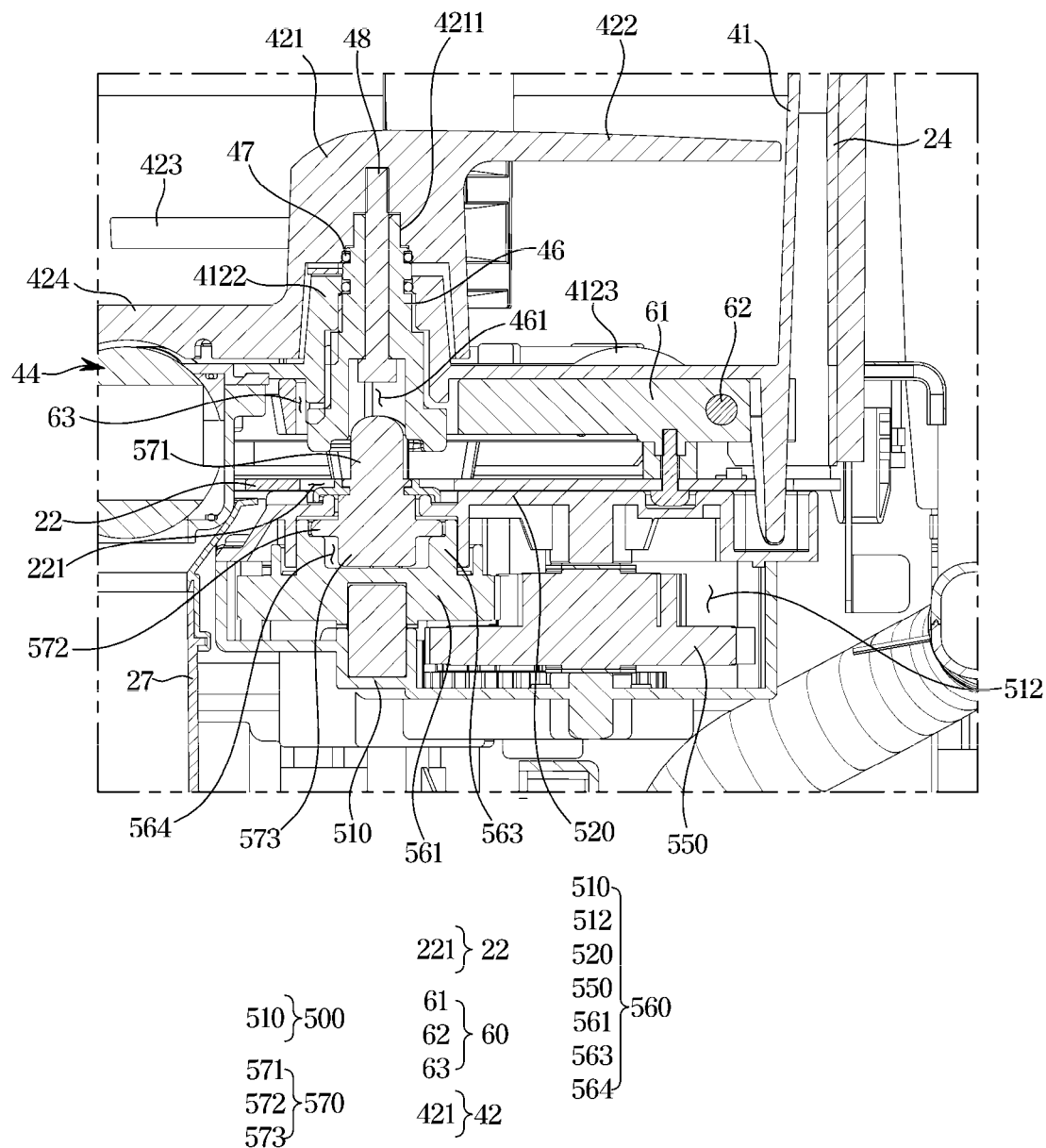
FIG. 12 is an enlarged view showing a B part of FIG. 4.

FIG. 11 is an exploded view showing components of a first driving device shown in FIG. 8. FIG. 12 is an enlarged view showing a B part of FIG. 4.

Referring to FIGS. 11 and 12, the first driver 500 may include the first driving case 510 and the first cover case 520.

The first driving case 510 may include a first driving case body 511 forming an appearance. An upper side of the first driving case body 511 may open. The first driving case body 511 may include a first gear accommodating space 512 in which a plurality of gears are accommodated.

The first cover case 520 may be coupled to the first driving case 510 to cover the open upper side of the first driving case 510. The first cover case 520 may be coupled to the first driving case 510 in the up-down direction.

The first cover case 520 may include a first cover case body 521 forming an appearance. The first cover case body 521 may include a shaft penetrating portion 522 which is formed by cutting a part of an upper portion of the first cover case body 521 and which the connecting shaft 570 may penetrate.

The first driver 500 may include the first driving motor 580 and a plurality of power transfer gears. The plurality of power transfer gears may include a first power transfer gear 530, a second power transfer gear 540, and a third power transfer gear 550.

The first driving motor 580 may include a motor shaft 581. The motor shaft 581 may rotate by power of the first driving motor 580.

The first power transfer gear 530 may be coupled to the motor shaft 581 of the first driving motor 580. The first power transfer gear 530 may rotate by being engaged with the motor shaft 581.

The second power transfer gear 540 may rotate by being engaged with the first power transfer gear 530.

The third power transfer gear 550 may rotate by being engaged with the second power transfer gear 540.

In FIG. 11, three power transfer gears are shown. However, a number of the power transfer gears is not limited to three, and various numbers of power transfer gears may be provided.

The first driver 500 may include a shaft driving gear 560 and the connecting shaft 570.

The shaft driving gear 560 may rotate by being engaged with the third power transfer gear 550. The shaft driving gear 560 may accommodate the connecting shaft 570 therein.

The connecting shaft 570 may be rested on an upper surface of the shaft driving gear 560. The connecting shaft 570 may rotate based on a rotation of the shaft driving gear 560. A description about operations of the connecting shaft 570 and the shaft driving gear 560 will be given below.

Figure 13:
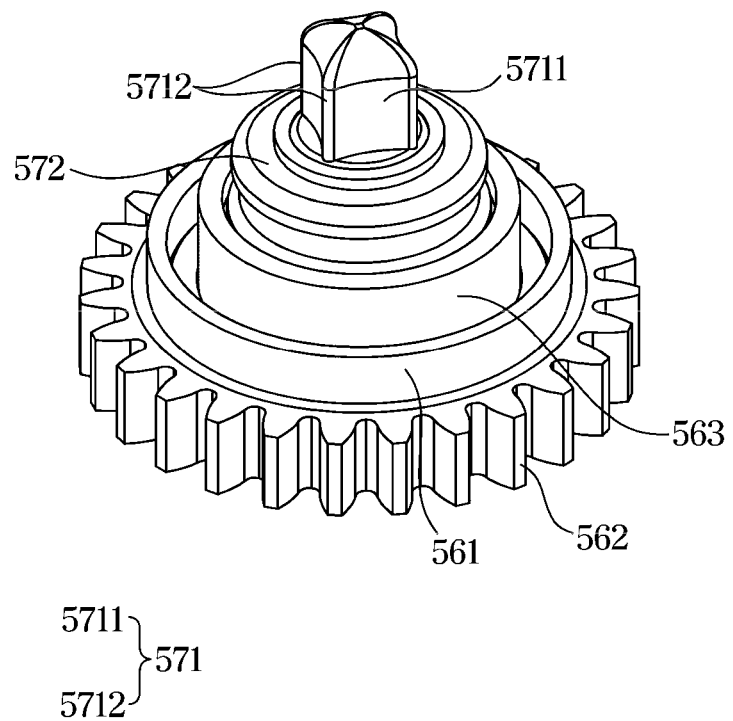
FIG. 13 shows a state in which a connecting shaft is coupled to a shaft driving gear shown in FIG. 11.
Figure 14:
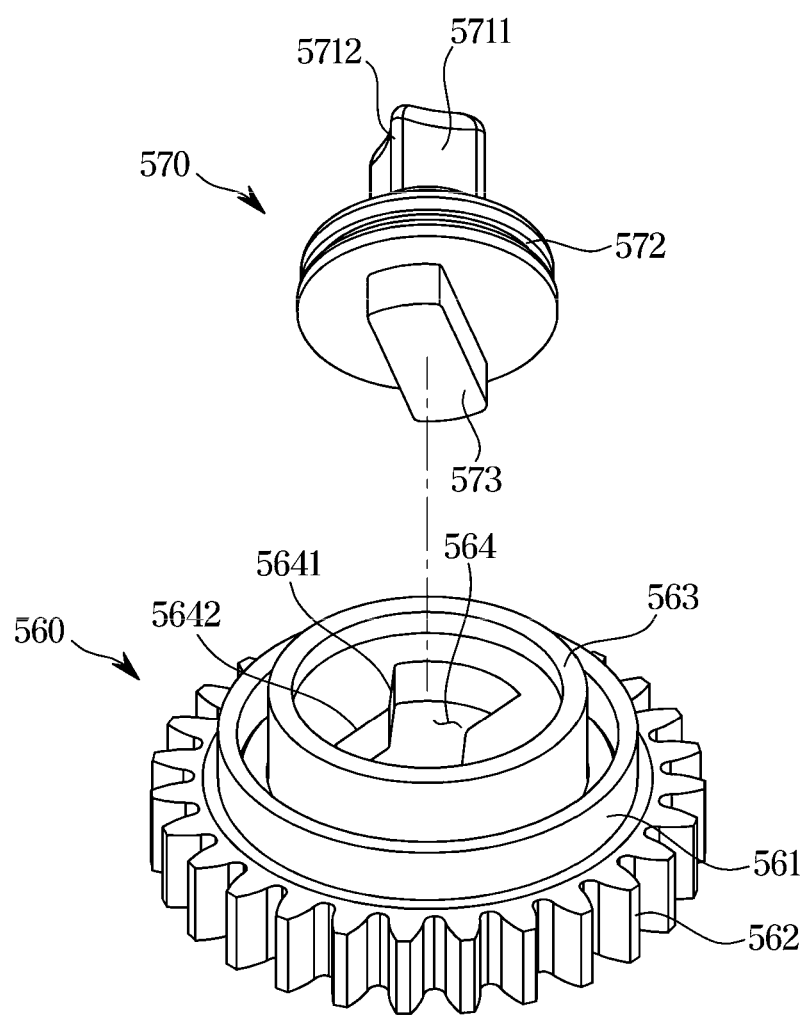
FIG. 14 is an exploded view of the connecting shaft and the shaft driving gear shown in FIG. 11.

FIG. 13 shows a state in which a connecting shaft is coupled to a shaft driving gear shown in FIG. 11. FIG. 14 is an exploded view of the connecting shaft and the shaft driving gear shown in FIG. 11.

Referring to FIGS. 13 and 14, the shaft driving gear 560 may include a gear body 561.

The shaft driving gear 560 may rotate by receiving power of the first driving motor 580.

The gear body 561 may form an appearance of the shaft driving gear 560. The gear body 561 may be in a shape of a circular plate. The gear body 561 may be rotatable based on a rotation of the third power transfer gear 550.

The shaft driving gear 560 may include a gear engaging portion 562.

The gear engaging portion 562 may be formed at an end portion of the gear body 561 in the circumferential direction. The gear engaging portion 562 may be formed along the circumferential direction that is perpendicular to a rotating shaft of the shaft driving gear 560.

The gear engaging portion 562 may be formed along the circumferential direction of the gear body 561 in such a way as to be engaged with the third power transfer gear 550.

The shaft driving gear 560 may include a shaft accommodating portion 563.

The shaft accommodating portion 563 may extend upward along a direction of a shaft of the gear body 561.

The shaft driving gear 560 may include a shaft resting groove 564.

The shaft resting groove 564 may be depressed inward from an upper surface of the shaft accommodating portion 563 to accommodate another end of the connecting shaft 570.

The shaft resting groove 564 may include a first guide portion 5641 and a second guide portion 5642.

The first guide portion 5641 may include a surface inclined with respect to a reference line passing a center of the shaft resting groove 564.

The second guide portion 5642 may include a surface inclined with respect to the reference line passing the center of the shaft resting groove 564.

An angle formed between an inner surface of the first guide portion 5641 and an inner surface of the second guide portion 5642 may be twice a first angle d1. Details about this will be described below.

One end of the connecting shaft 570 may be inserted in the grinder rotating shaft 46 and another end may be inserted in the shaft driving gear 560 to transfer power from the shaft driving gear 560 to the grinder rotating shaft 46.

The connecting shaft 570 may be rotatable with respect to the shaft driving gear 560 within a preset angle range.

The connecting shaft 570 may include a support body 572 and a shaft body 571.

The support body 572 may be accommodated in the shaft driving gear 560. The support body 572 may be rotatable to a preset angle with respect to the shaft driving gear 560.

The shaft body 571 may extend upward from the support body 572 and be inserted in the grinder rotating shaft 46.

The shaft body 571 may include a plurality of contact portions 5711 and an edge portion 5712.

The plurality of contact portions 5711 may be inserted in the grinder rotating shaft 46 to be in contact with an inner surface of the grinder rotating shaft 46.

The plurality of contact portions 5711 may be curved surfaces. The curved surfaces may be inserted in the shaft inserting hole 461 of the grinder rotating shaft 46 to be in surface contact with the inner surface of the grinder rotating shaft 46.

The edge portion 5712 may connect the plurality of contact portions 5711 to each other.

The connecting shaft 570 may include an extension body 573.

The extension body 573 may extend downward from the support body 572 and be inserted in the shaft driving gear 560. The extension body 573 may be rotatable inside the shaft driving gear 560.

The extension body 573 may include a rectangular cross section. The extension body 573 may protrude from a lower surface of the support body 572.

For example, the extension body 573 may be accommodated in the shaft resting groove 564 of the shaft driving gear 560 to be in contact with the first guide portion 5641 and the second guide portion 5642.

Figure 15:
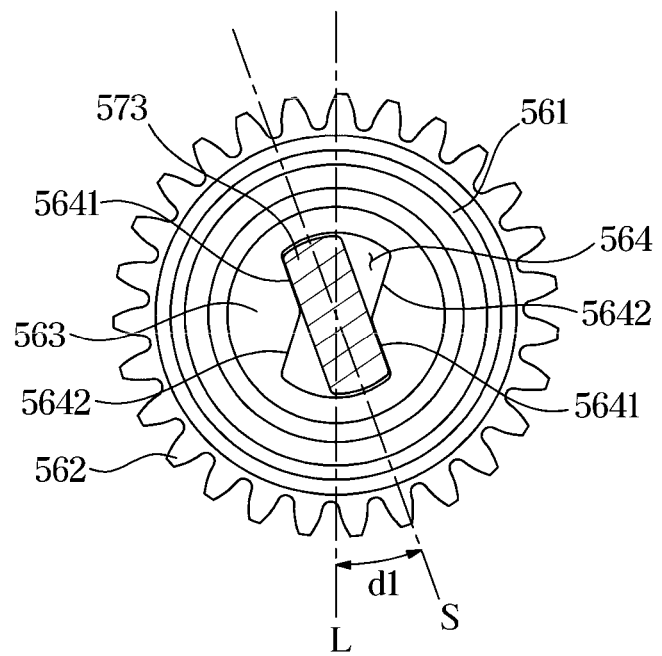
FIGS. 15, 16, and 17 show an operation in which the connecting shaft rotates inside the shaft driving gear shown in FIG. 14.
Figure 16:
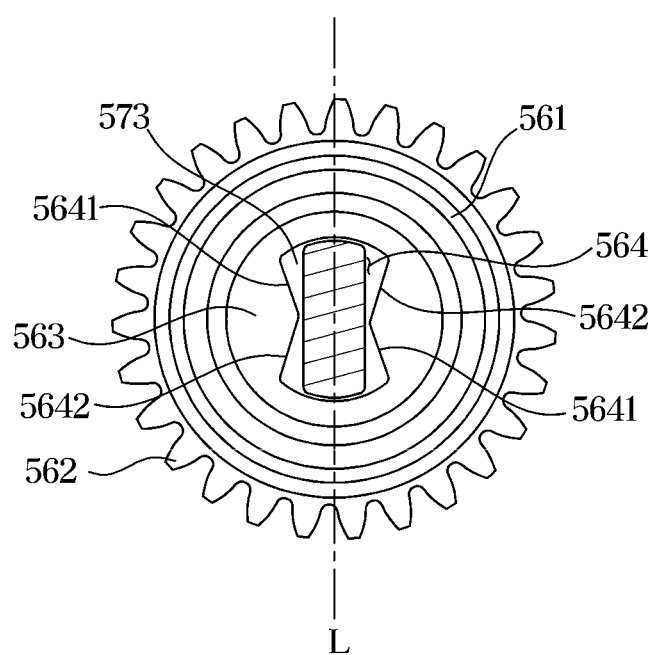
Figure 17:
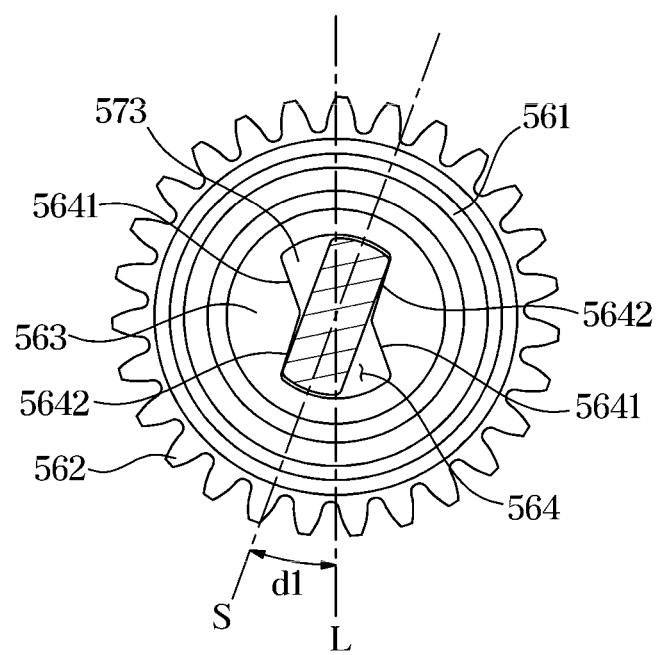

FIGS. 15, 16, and 17 show an operation in which the connecting shaft rotates inside the shaft driving gear shown in FIG. 14.

As shown in FIG. 15, the extension body 573 of the connecting shaft 570 may rotate inside the shaft resting groove 564 of the shaft driving gear 560 in a first direction.

For example, the extension body 573 of the connecting shaft 570 may rotate in a left direction to be in contact with the first guide portion 5641 of the shaft resting groove 564 of the shaft driving gear 560.

An angle formed by a center line S of the extension body 573 with respect to a center line L of the shaft resting groove 564 may be the first angle d1.

As shown in FIG. 16, the extension body 573 of the connecting shaft 570 may be positioned at a location at which the center line S of the extension body 573 of the connecting shaft 570 is aligned with the center line L of the shaft resting groove 564.

As shown in FIG. 17, the extension body 573 of the connecting shaft 570 may rotate inside the shaft resting groove 564 of the shaft driving gear 560 in a second direction. The second direction may be an opposite direction of the first direction.

For example, the extension body 573 of the connecting shaft 570 may rotate in a right direction to be in contact with the second guide portion 5642 of the shaft resting groove 564 of the shaft driving gear 560.

At this time, an angle formed by the center line S of the extension body 573 with respect to the center line L of the shaft resting groove 564 may be the first angle d1.

The shaft resting groove 564 of the shaft driving gear 560 may open at the upper side to accommodate the extension body 573, and include a larger area than a cross section of the extension body 573. Accordingly, the extension body 573 of the connecting shaft 570 may be rotatable inside the shaft driving gear 560.

In the food waste disposer 1 according to an embodiment of the disclosure, the connecting shaft 570 may include four contact portions 5711 and four edge portions 5712.

Accordingly, the first angle d1 may be about 22.5 degrees. Accordingly, the connecting shaft 570 may be rotatable within an angle range of 45 degrees with respect to the shaft driving gear 560.

In the food waste disposer 1 according to an embodiment of the disclosure, because the processor 40 including the grinding case 41 is separable from the inside of the housing 10 to the outside, the rotating grinder 42 positioned inside the grinding case 41 may rotate by various factors.

At this time, in a case in which a user installs the grinding case 41 inside the housing 10, the grinder rotating shaft 46 rotating together with the rotating grinder 42 may be misaligned from the connecting shaft 570 for transferring power to the grinder rotating shaft 46.

In an existing technique, the connecting shaft 570 as a component connected to a driving gear may not rotate unless a great force is applied to the connecting shaft 570.

However, in the disclosure, by providing a rotational degree of freedom to the connecting shaft 570 such that the connecting shaft 570 is rotatable within a preset angle range with respect to the shaft driving gear 560, the connecting shaft 570 may rotate to a location of the shaft inserting hole 461 of the grinder rotating shaft 46, thereby implementing a complete installation of the processor 40.

In other words, because the connecting shaft 570 rotates upon installation of the grinding case 41 in the inside of the housing 10 from the outside, one end of the connecting shaft 570 may be inserted into the grinder rotating shaft 46.

Figure 18:
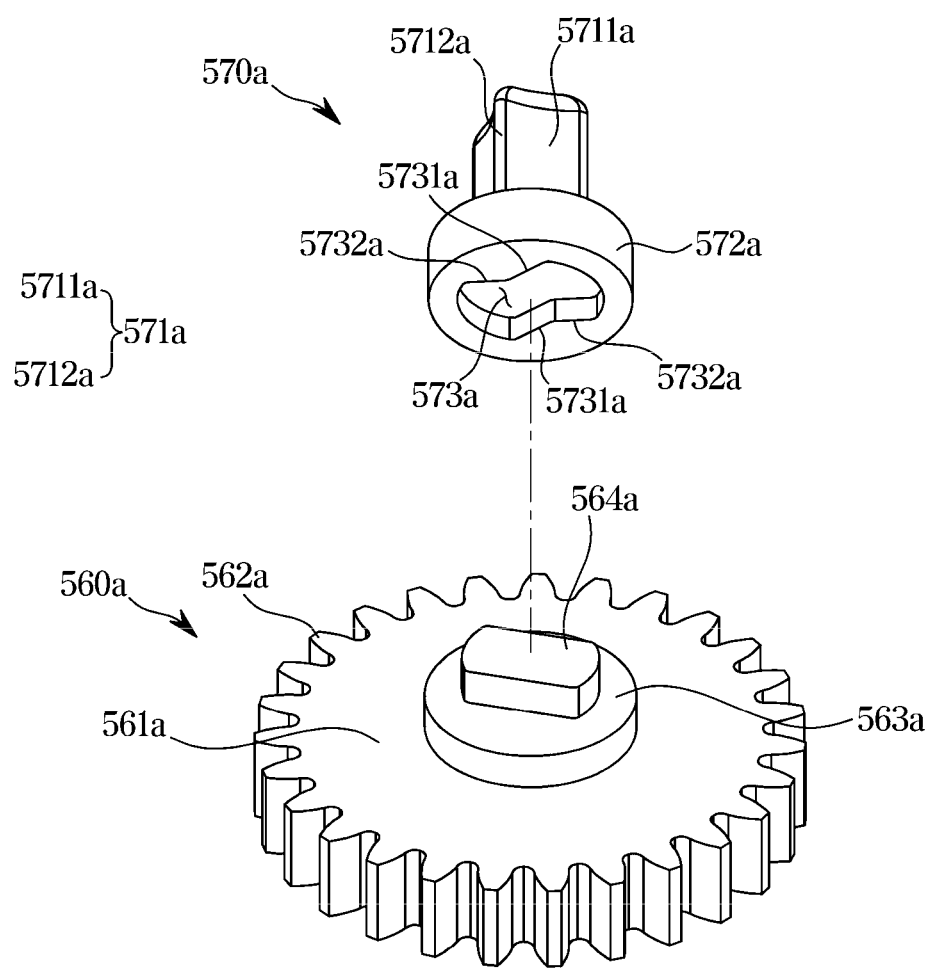
FIG. 18 is an exploded view showing a shaft driving gear and a connecting shaft of a food waste disposer according to an embodiment of the disclosure.

FIG. 18 is an exploded view showing a shaft driving gear and a connecting shaft of a food waste disposer according to an embodiment of the disclosure.

A driver shown in FIG. 0.18 may use the same components as those of the food waste disposer 1 according to an embodiment of the disclosure as described above, except for a shaft driving gear 560a and a connecting shaft 570a shown in FIG. 18.

Accordingly, components which will be not described below are assigned like reference numerals as those of the corresponding ones described above with reference to FIGS. 1 to 17.

Referring to FIG. 18, the shaft driving gear 560a may be inserted in an upper surface of the connecting shaft 570a.

The shaft driving gear 560a may include a gear body 561a, a gear engaging portion 562a, a shaft support portion 563a, and an extension body 564a.

The shaft driving gear 560a may rotate by receiving power of the first driving motor.

The gear body 561a may form an appearance of the shaft driving gear 560a. The gear body 561a may be in a shape of a circular plate. The gear body 561a may be rotatable based on a rotation of the third power transfer gear 550.

The shaft driving gear 560a may include the gear engaging portion 562a.

The gear engaging portion 562a may be formed at one end in circumferential direction of the gear body 561a. The gear engaging portion 562a may be formed along the circumferential direction which is perpendicular to a rotating shaft of the shaft driving gear 560a.

The gear engaging portion 562a may be formed along the circumferential direction of the gear body 561a to be engaged with the third power transfer gear 550.

The shaft driving gear 560a may include the shaft support portion 563a.

The shaft support portion 563a may extend upward along a direction of a shaft of the gear body 561a.

The shaft driving gear 560a may include an extension body 564a.

The extension body 564a may extend upward from the gear body 561a toward the connecting shaft 570a.

The extension body 564a may extend upward from the shaft support portion 563a to be inserted in the connecting shaft 570a. The extension body 564a may be rotatable inside the connecting shaft 570a.

The extension body 564a may have a rectangular cross section. The extension body 564a may protrude from an upper surface of the shaft support portion 563a.

For example, the extension body 564a may be accommodated in an extension body resting groove 573a of the connecting shaft 570a to be in contact with a first guide portion 5731a and a second guide portion 5732a.

One end of the connecting shaft 570a may be inserted in the grinder rotating shaft 46, and the shaft driving gear 560a may be inserted in another end of the connecting shaft 570a to transfer power from the shaft driving gear 560a to the grinder rotating shaft 46.

The connecting shaft 570a may be rotatable within a range of the first angle d1 with respect to the shaft driving gear 560a.

The connecting shaft 570a may include a support body 572a and a shaft body 571a.

The support body 572a may accommodate the shaft driving gear 560a. The support body 572a may be rotatable to a preset angle with respect to the shaft driving gear 560a.

The support body 571a may extend upward from the support body 572a to be inserted in the grinder rotating shaft 46.

The shaft body 571a may include a plurality of contact portions 5711a and an edge portion 5712a.

The plurality of contact portions 5711a may be inserted in the grinder rotating shaft 46 to be in contact with the inner surface of the grinder rotating shaft 46.

The plurality of contact portions 5711a may be curved surface portions. The curved surface portions may be inserted in the shaft inserting hole of the grinder rotating shaft 46 to be in surface contact with the inner surface of the grinder rotating shaft 46.

The edge portion 5712a may connect the plurality of contact portions 5711a to each other.

The connecting shaft 570a may include the extension body resting groove 573a.

The extension body resting groove 573a may be depressed inward from a lower surface of the shaft body 571a to accommodate the extension body 564a, and have a larger area than a cross section of the extension body 564a.

The extension body resting groove 573a may be depressed inward from a lower surface of the support body 572a to accommodate the extension body 564a of the shaft driving gear 560a.

The extension body resting groove 573a may include a first guide portion 5731a and a second guide portion 5732a.

The first guide portion 5731a may have a surface inclined with respect to a reference line passing a center of the extension body resting groove 573a.

The second guide portion 5732a may have a surface inclined with respect to the reference line passing the center of the extension body resting groove 573a.

An angle formed between an inner surface of the first guide portion 5631a and an inner surface of the second guide portion 5632a may be twice the first angle d1.

Unlike the shaft driving gear 560 and the connecting shaft 570 of the food waste disposer 1 according to an embodiment of the disclosure, the shaft driving gear 560a and the connecting shaft 570a of FIG. 18 may have opposite shapes. The extension body 564a may be formed on an upper surface of the shaft driving gear 560a.

Figure 19:
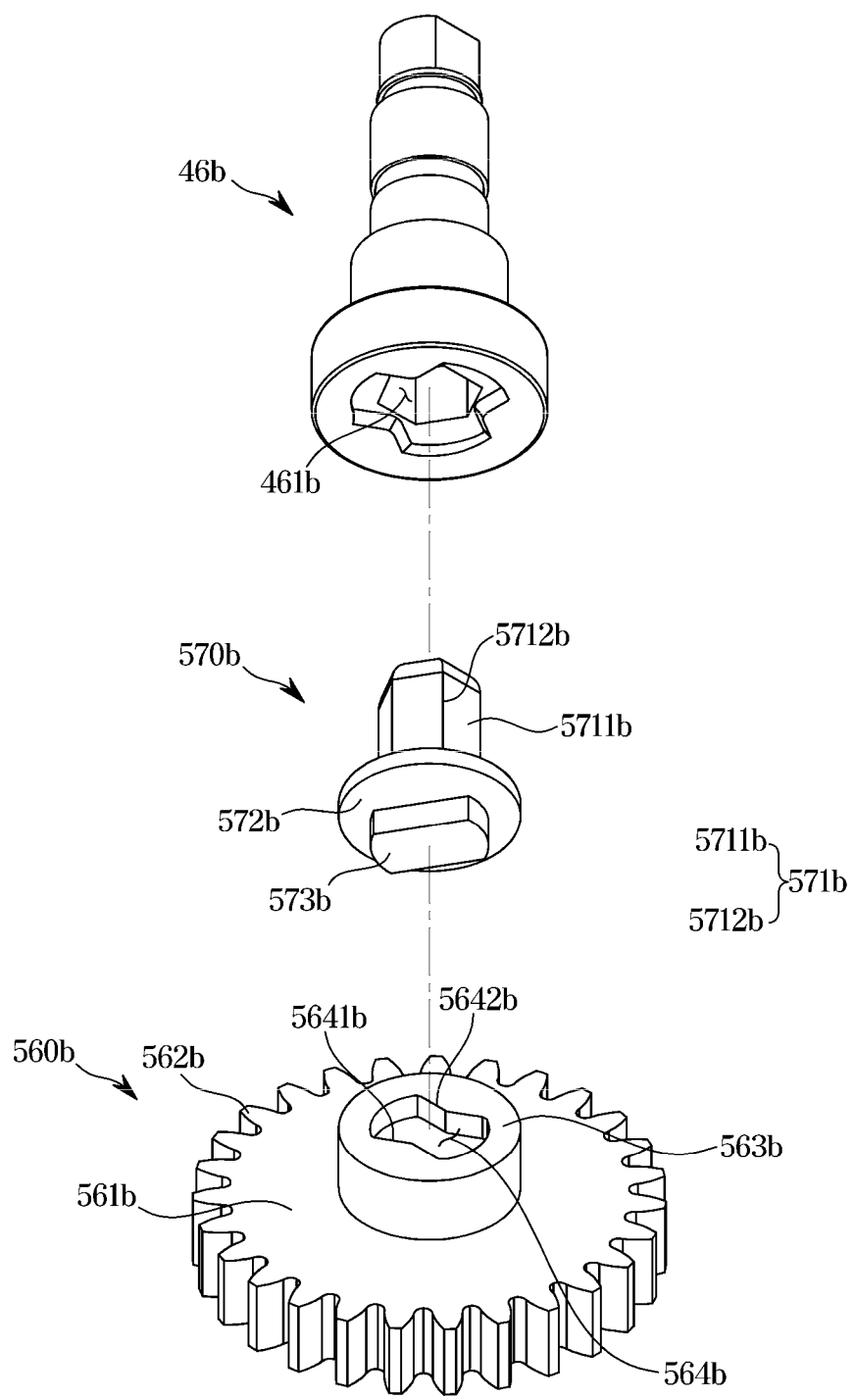
FIG. 19 is an exploded view showing a grinder rotating shaft, a shaft driving gear, and a connecting shaft of a food waste disposer according to an embodiment of the disclosure.
Figure 20:
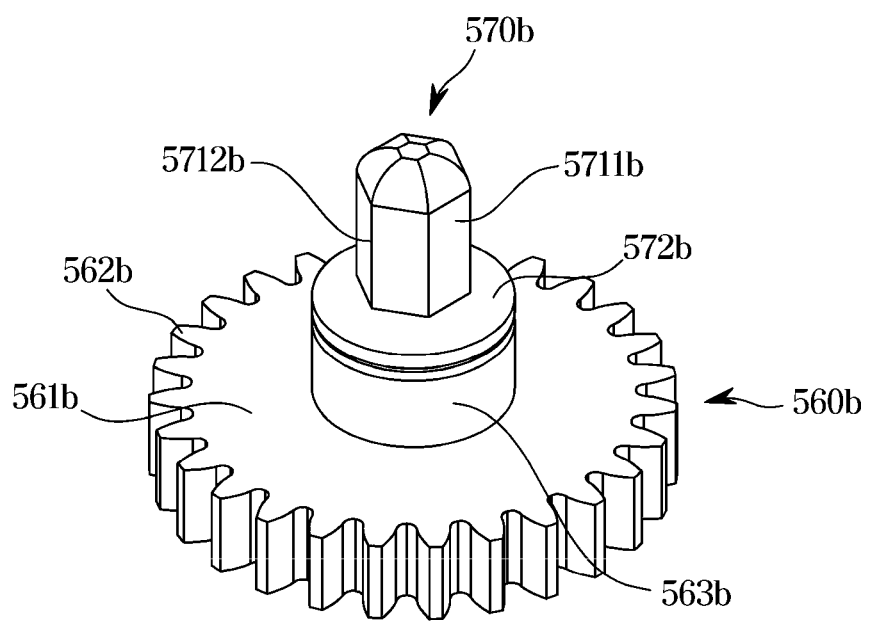
FIG. 20 shows a state in which the connecting shaft shown in FIG. 18 is coupled to the shaft driving gear.
Figure 21:
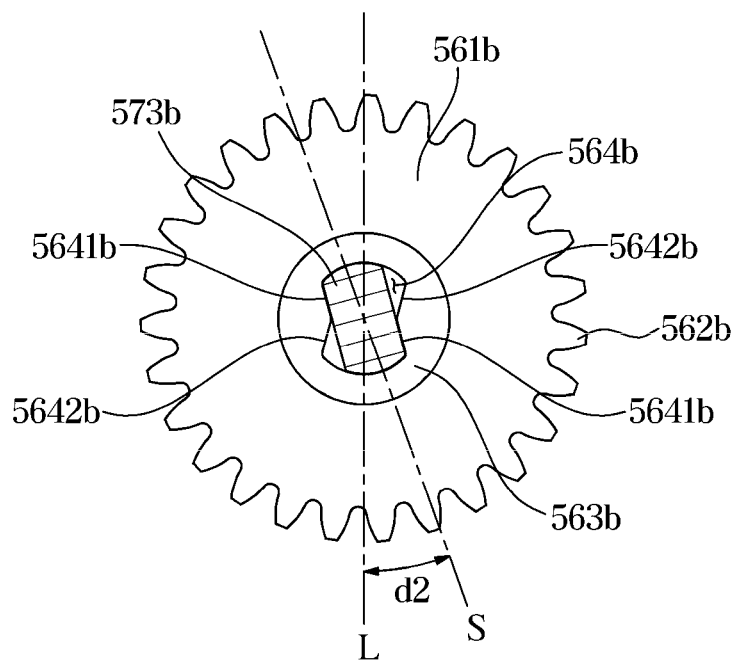
FIGS. 21, 22, and 23 show an operation in which the connecting shaft rotates inside the shaft driving gear shown in FIG. 19.
Figure 22:
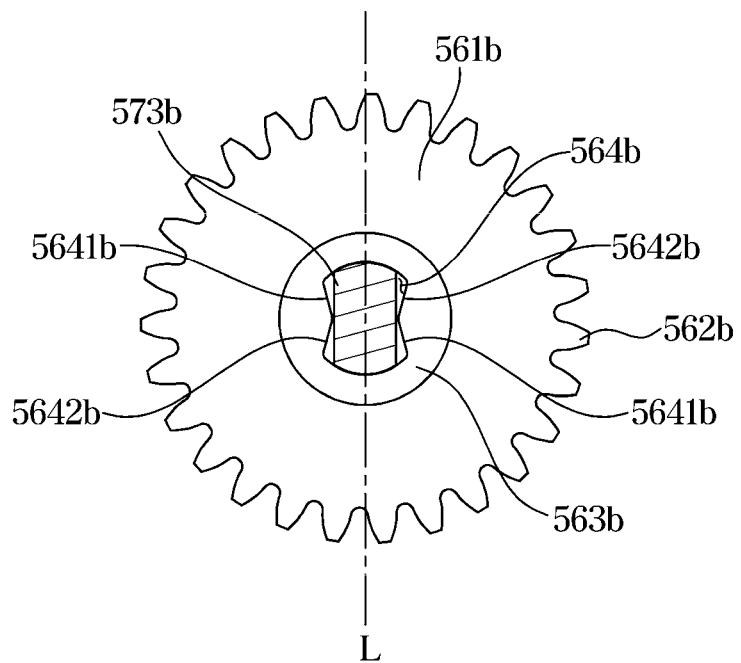
Figure 23:
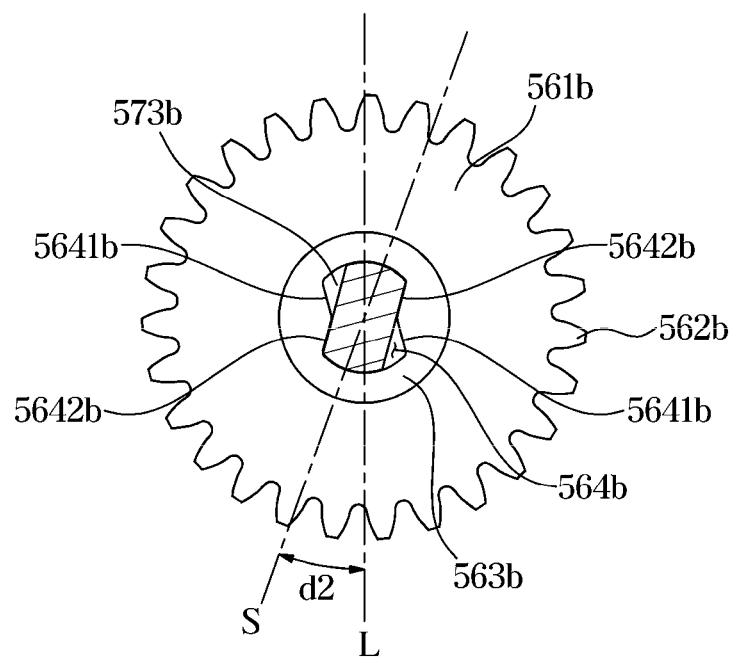

FIG. 19 is an exploded view showing a grinder rotating shaft, a shaft driving gear, and a connecting shaft of a food waste disposer according to an embodiment of the disclosure. FIG. 20 shows a state in which the connecting shaft shown in FIG. 18 is coupled to the shaft driving gear. FIGS. 21, 22, and 23 shows an operation in which the connecting shaft rotates inside the shaft driving gear shown in FIG. 19.

A driver shown in FIGS. 19 to 23 may use the same components as those of the food waste disposer 1 according to an embodiment of the disclosure as described above, except for a shaft driving gear 560b and a connecting shaft 570b shown in FIGS. 19 to 23.

Accordingly, components which will be not described below are assigned like reference numerals as those of the corresponding ones described above with reference to FIGS. 1 to 17.

A grinder rotating shaft 46b may include a shaft inserting hole 461b opening downward. The shaft inserting hole 461b may have a shape corresponding to a shape of the connecting shaft 570b. For example, because the connecting shaft 570b has a hexagonal cross section, an inner surface of the shaft inserting hole 461a may also have a hexagonal cross section.

Referring to FIGS. 19 to 23, the shaft driving gear 560b may include a gear body 561b.

The shaft driving gear 560b may rotate by receiving power of the first driving motor.

The gear body 561b may form an appearance of the shaft driving gear 560b. The gear body 561b may be in a shape of a circular plate. The gear body 561b may be rotatable based on a rotation of the third power transfer gear.

The shaft driving gear 560b may include a gear engaging portion 562b.

The gear engaging portion 562b may be formed at an end portion in circumferential direction of the gear body 561b. The gear engaging portion 562b may be formed along the circumferential direction that is perpendicular to a rotating shaft of the shaft driving gear 560b.

The gear engaging portion 562b may be formed along the circumferential direction of the gear body 561b to be engaged with the third power transfer gear.

The shaft driving gear 560b may include a shaft accommodating portion 563b.

The shaft accommodating portion 563b may extend upward along a direction of a shaft of the gear body 561b.

The shaft driving gear 560b may include a shaft resting groove 564b.

The shaft resting groove 564b may be depressed inward from an upper surface of the shaft accommodating portion 563b to accommodate the other end of the connecting shaft 570b.

The shaft resting groove 564b may include a first guide portion 5641b and a second guide portion 5642b.

The first guide portion 5641b may have a surface inclined with respect to a reference line passing a center of the shaft resting groove 564b.

The second guide portion 5642b may have a surface inclined with respect to the reference line passing the center of the shaft resting groove 564b.

An angle formed between an inner surface of the first guide portion 5641b and an inner surface of the second guide portion 5642b may be twice a second angle d2. Details about this will be described below.

One end of the connecting shaft 570b may be inserted in the grinder rotating shaft 46b, and another end of the connecting shaft 570b may be inserted in the shaft driving gear 560b to transfer power from the shaft driving gear 560b to the grinder rotating shaft 46b.

The connecting shaft 570b may be rotatable with respect to the shaft driving gear 560b within a range of a preset angle.

The connecting shaft 570b may include a support body 572b and a shaft body 571b.

The support body 572b may be accommodated in the shaft driving gear 560b.

The support body 572b may be rotatable to the preset angle with respect to the shaft driving gear 560b.

The shaft body 571b may extend upward from the support body 572b to be inserted in the grinder rotating shaft 46b.

The shaft body 571b may include a plurality of contact portions 5711b and an edge portion 5712b.

The plurality of contact portions 5711b may be inserted in the grinder rotating shaft 46b to be in contact with an inner surface of the grinder rotating shaft 46b.

The plurality of contact portions 5711b may be curved surface portions. The curved surface portions may be inserted in the shaft inserting hole 461b of the grinder rotating shaft 46b to be in surface contact with the inner surface of the grinder rotating shaft 46b.

The edge portion 5712b may connect the plurality of contact portions 5711b to each other.

The connecting shaft 570b may include an extension body 573b.

The extension body 573b may extend downward from the support body 572b to be inserted in the shaft driving gear 560b. The extension body 573b may be rotatable inside the shaft driving gear 560b.

The extension body 573b may have a rectangular cross section. The extension body 573b may protrude from a lower surface of the support body 572b.

For example, the extension body 573b may be accommodated in a shaft resting groove 564b of the shaft driving gear 560b to be in contact with the first guide portion 5641b and the second guide portion 5642b.

FIGS. 21, 22, and 23 shows an operation in which the connecting shaft 570b rotates inside the shaft driving gear 560b shown in FIGS. 19 and 20.

As shown in FIG. 21, the extension body 573b of the connecting shaft 570b may rotate in the first direction inside the shaft resting groove 564b of the shaft driving gear 560b. For example, the extension body 573b of the connecting shaft 570b may rotate in the left direction to be in contact with the first guide portion 5641b of the shaft resting groove 564b of the shaft driving gear 560b.

At this time, an angle formed by a center line S of the extension body 573b with respect to a center line L of the shaft resting groove 564b may be the second angle d2.

As shown in FIG. 22, the extension body 573b of the connecting shaft 570b may be positioned at a location at which the center line S of the extension body 573b of the connecting shaft 570b is aligned with the center line L of the shaft resting groove 564b.

As shown in FIG. 23, the extension body 573b of the connecting shaft 570b may rotate in the second direction inside the shaft resting groove 564b of the shaft driving gear 560b. The second direction may be an opposite direction of the first direction.

For example, the extension body 573b of the connecting shaft 570b may rotate in the right direction to be in contact with the second guide portion 5642b of the shaft resting groove 564b of the shaft driving gear 560b.

At this time, an angle formed by the center line S of the extension body 573b with respect to the center line L of the shaft resting groove 564b may be the second angle d2.

The shaft resting groove 564b of the shaft driving gear 560b may open at the upper side to accommodate the extension body 573b, and have a larger area than a cross section of the extension body 573b. Accordingly, the extension body 573b of the connecting shaft 570b may be rotatable inside the shaft driving gear 560b.

In the food waste disposer according to an embodiment of the disclosure, the connecting shaft 570b may include six contact portions 5711b and six edge portions 5712b.

Accordingly, the second angle d2 may be about 15 degrees. Accordingly, the connecting shaft 570b may be rotatable within an angle range of 30 degrees with respect to the shaft driving gear 560b.

However, a rotation angle of the connecting shaft 570b is not limited to this, and an angle to which the connecting shaft 570b rotates with respect to the shaft driving gear 560b may vary according to a shape of a cross section of the connecting shaft 570b.

So far, specific embodiments have been shown and described, however, the disclosure is not limited to these embodiments. It should be interpreted that various modifications may be made by one of ordinary skill in the technical art to which the disclosure belongs, without deviating from the gist of the technical concept of the disclosure, which is defined in the following claims.

What is claimed is:

1. A food waste disposer comprising:
    a housing;
    a grinding case positioned inside the housing, separable from inside of the housing to outside of the housing, and configured to treat food waste;
    a rotating grinder rotatably coupled with respect to a bottom surface of the grinding case and configured to treat the food waste by rotating inside the grinding case;
    a grinder rotating shaft configured to be inserted in the rotating grinder and to rotate together with the rotating grinder; and
    a driver positioned below the grinding case and configured to provide rotation power of the rotating grinder,
    wherein the driver comprises:
    a driving motor configured to generate power;
    a shaft driving gear configured to rotate by receiving the power of the driving motor; and
    a connecting shaft configured to be rotatable within a range of a first angle with respect to the shaft driving gear, wherein one end of the connecting shaft is inserted in the grinder rotating shaft and another end of the connecting shaft is inserted in the shaft driving gear to transfer power from the shaft driving gear to the grinder rotating shaft.

2. The food waste disposer of claim 1, wherein the connecting shaft comprises:
    a support body accommodated in the shaft driving gear; and
    a shaft body extending upward from the support body and inserted in the grinder rotating shaft.

3. The food waste disposer of claim 2, wherein the connecting shaft further comprises:
    an extension body that is extended downward from the support body, inserted in the shaft driving gear, and rotatable inside the shaft driving gear.

4. The food waste disposer of claim 3, wherein:
    the shaft driving gear comprises a shaft resting groove;
    an upper side of the shaft resting groove opens to accommodate the extension body; and
    a cross section of the shaft resting groove is larger than a cross section of the extension body.

5. The food waste disposer of claim 4, wherein the shaft resting groove comprises:
    a first guide portion including a surface inclined with respect to a reference line passing a center of the shaft resting groove; and
    a second guide portion that is symmetrical to the first guide portion with respect to the reference line.

6. The food waste disposer of claim 5, wherein:
    the first angle is an angle formed between an inner surface of the first guide portion and an inner surface of the second guide portion.

7. The food waste disposer of claim 2, wherein the grinder rotating shaft comprises a shaft inserting hole that opens downward and in which the shaft body is accommodated, and
    the shaft body comprises a curved surface portion inserted in the shaft inserting hole to be in surface contact with an inner surface of the grinder rotating shaft.

8. The food waste disposer of claim 1, wherein:
    the driver further comprises a power transfer gear that connects the driving motor to the shaft driving gear; and
    the shaft driving gear comprises:
    a gear body that is rotatable;
    a gear engaging portion formed along a circumferential direction of the gear body and configured to engage with the power transfer gear; and
    a shaft accommodating portion extending upward along a direction of a shaft of the gear body.

9. The food waste disposer of claim 8, wherein the shaft accommodating portion comprises a shaft resting groove depressed inward from an upper surface of the shaft accommodating portion, and
    wherein the other end of the connecting shaft is accommodated in the shaft resting groove.

10. The food waste disposer of claim 1, wherein:
    the shaft driving gear comprises an extension body that extends upward from a gear body toward the connecting shaft; and
    the connecting shaft comprises an extension body resting groove depressed inward from a bottom surface of a shaft body to accommodate the extension body; and
    a cross section of the extension body resting groove is larger than a cross section of the extension body.

11. The food waste disposer of claim 1, wherein:
    the grinding case is configured to be installed from the outside of the housing to the inside of the housing; and while the grinding case is installed inside of the housing, the connecting shaft is rotatable and the one end of the connecting shaft is inserted into the grinder rotating shaft.

12. The food waste disposer of claim 1, wherein the connecting shaft comprises:
   a plurality of contact portions configured to insert in the grinder rotating shaft and to be in contact with an inner surface of the grinder rotating shaft while inserted; and
   an edge portion connecting the plurality of contact portions to each other.

13. The food waste disposer of claim 12, wherein the plurality of contact portions are provided as curved surface portions.

14. The food waste disposer of claim 13, wherein the plurality of contact portions includes four curved surface portions.

15. The food waste disposer of claim 1, wherein the first angle is 45 degrees or less.

16. A food waste disposer comprising:
   a rotating grinder rotatably coupled with respect to a bottom surface of a grinding case and configured to treat the food waste by rotating inside the grinding case;
   a grinder rotating shaft configured to be inserted in the rotating grinder and to rotate together with the rotating grinder; and
   a driver positioned below the grinding case and configured to provide rotation power of the rotating grinder, wherein the driver comprises:
   a driving motor configured to generate power;
   a shaft driving gear configured to rotate by receiving the power of the driving motor; and
   a connecting shaft configured to be rotatable within a range of a first angle with respect to the shaft driving gear, wherein a first end of the connecting shaft is configured to be inserted in the grinder rotating shaft and a second end of the connecting shaft is configured to be inserted in the shaft driving gear to transfer power from the shaft driving gear to the grinder rotating shaft.

17. The food waste disposer of claim 16, wherein the grinding case is configured to:
   be installed inside of a housing such that the grinding case is positioned inside the housing; and
   be separated from inside of the housing and removed to outside of the housing.

18. The food waste disposer of claim 17, wherein while the grinding case is installed inside of the housing, the connecting shaft is rotatable and the first end of the connecting shaft rotates to be inserted into the grinder rotating shaft.

19. The food waste disposer of claim 17, further comprising a heating device positioned between the grinding case and the driver to be in contact with the grinding case while the grinding case is installed inside of the housing.

20. The food waste disposer of claim 16, further comprising a second driver.

* * * * *